(12) United States Patent
Sengoku

(10) Patent No.: US 10,139,875 B2
(45) Date of Patent: *Nov. 27, 2018

(54) FAREWELL RESET AND RESTART METHOD FOR COEXISTENCE OF LEGACY AND NEXT GENERATION DEVICES OVER A SHARED MULTI-MODE BUS

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/067,111

(22) Filed: Mar. 10, 2016

(65) Prior Publication Data

US 2016/0195910 A1    Jul. 7, 2016

Related U.S. Application Data

(63) Continuation-in-part of application No. 14/626,847, filed on Feb. 19, 2015, now Pat. No. 9,852,104.

(Continued)

(51) Int. Cl.
 *G06F 1/24* (2006.01)
 *G06F 13/40* (2006.01)
 *G06F 13/42* (2006.01)

(52) U.S. Cl.
 CPC ............ *G06F 1/24* (2013.01); *G06F 13/4022* (2013.01); *G06F 13/4027* (2013.01);
 (Continued)

(58) Field of Classification Search
 None
 See application file for complete search history.

(56) References Cited

U.S. PATENT DOCUMENTS 6,574,233 B1   6/2003  Fuller, Jr. et al.
6,952,751 B1  10/2005  Gulick
(Continued)

FOREIGN PATENT DOCUMENTS

CN    1132381 C    12/2003
TW    I419486 B    12/2013
WO    WO-0042740 A1    7/2000

OTHER PUBLICATIONS

International Search Report and Written Opinion—PCT/US2016/022175—ISA/EPO—dated May 25, 2016.

*Primary Examiner* — Idriss N Alrobaye
*Assistant Examiner* — Dayton Lewis-Taylor
(74) *Attorney, Agent, or Firm* — Loza & Loza LLP

(57) ABSTRACT

A first set of devices is coupled to a first bus, a second bus, and configured to communicate over the first bus according to a first communication protocol. A second set of devices is also coupled to the first bus and configured to communicate over the first bus according to both the first communication protocol and a second communication protocol. In a first mode, the first set of devices and second set of devices may concurrently communicate over the first bus using the first communication protocol. In a second mode, the second set of devices communicate using the second communication protocol over the bus, and the first set of devices to stop operating on the first bus. An enable command is sent by at least one of the second set of devices over a second bus to cause the first set of devices to resume activity over the first bus.

19 Claims, 18 Drawing Sheets

Related U.S. Application Data

(60) Provisional application No. 62/131,802, filed on Mar. 11, 2015, provisional application No. 61/942,215, filed on Feb. 20, 2014.

(52) U.S. Cl.
CPC ...... *G06F 13/4282* (2013.01); *G06F 13/4291* (2013.01); *G06F 13/4295* (2013.01)

(56) References Cited

U.S. PATENT DOCUMENTS

| | | | |
|---|---|---|---|
| 7,039,734 B2 * | 5/2006 | Sun | G06F 13/4291 710/110 |
| 7,685,320 B1 * | 3/2010 | Wishneusky | G06F 1/26 323/222 |
| 2004/0153726 A1 | 8/2004 | Suzuki | |
| 2011/0194595 A1 | 8/2011 | Shetty | |
| 2014/0013017 A1 | 1/2014 | Decesaris et al. | |
| 2014/0372642 A1 | 12/2014 | Sengoku et al. | |
| 2015/0234774 A1 | 8/2015 | Sengoku | |
| 2015/0370735 A1 | 12/2015 | Pitigoi-Aron et al. | |

\* cited by examiner $$\begin{aligned}
\text{Bits} &= T_{11} \times 3^{11} \\
&+ T_{10} \times 3^{10} \\
&+ T_9 \times 3^9 \\
&+ T_8 \times 3^8 \\
&+ T_7 \times 3^7 \\
&+ T_6 \times 3^6 \\
&+ T_5 \times 3^5 \\
&+ T_4 \times 3^4 \\
&+ T_3 \times 3^3 \\
&+ T_2 \times 3^2 \\
&+ T_1 \times 3 \\
&+ T_0
\end{aligned}$$

*FIG. 12*

$$T_{11} = \text{Bits} / 3^{11} \quad, \quad M_{11} = \text{Bits} \% 3^{11}$$
$$T_{10} = M_{11} / 3^{10} \quad, \quad M_{10} = M_{11} \% 3^{10}$$
$$T_{9} = M_{10} / 3^{9} \quad, \quad M_{9} = M_{10} \% 3^{9}$$
$$T_{8} = M_{9} / 3^{8} \quad, \quad M_{8} = M_{9} \% 3^{8}$$
$$T_{7} = M_{8} / 3^{7} \quad, \quad M_{7} = M_{8} \% 3^{7}$$
$$T_{6} = M_{7} / 3^{6} \quad, \quad M_{6} = M_{7} \% 3^{6}$$
$$T_{5} = M_{6} / 3^{5} \quad, \quad M_{5} = M_{6} \% 3^{5}$$
$$T_{4} = M_{5} / 3^{4} \quad, \quad M_{4} = M_{5} \% 3^{4}$$
$$T_{3} = M_{4} / 3^{3} \quad, \quad M_{3} = M_{4} \% 3^{3}$$
$$T_{2} = M_{3} / 3^{2} \quad, \quad M_{2} = M_{3} \% 3^{2}$$
$$T_{1} = M_{2} / 3 \quad, \quad M_{1} = M_{2} \% 3$$
$$T_{0} = M_{1}$$

*FIG. 13*

$$T_{11} = (\text{Bits} \geq 3^{11} \times 2) ? 2 : (\text{Bits} \geq 3^{11}) ? 1 : 0, \quad M_{11} = \text{Bits} - T_{11} \times 3^{11}$$
$$T_{10} = (M_{11} \geq 3^{10} \times 2) ? 2 : (M_{11} \geq 3^{10}) ? 1 : 0, \quad M_{10} = M_{11} - T_{10} \times 3^{10}$$
$$T_{9} = (M_{10} \geq 3^{9} \times 2) ? 2 : (M_{10} \geq 3^{9}) ? 1 : 0, \quad M_{9} = M_{10} - T_{9} \times 3^{9}$$
$$T_{8} = (M_{9} \geq 3^{8} \times 2) ? 2 : (M_{9} \geq 3^{8}) ? 1 : 0, \quad M_{8} = M_{9} - T_{8} \times 3^{8}$$
$$T_{7} = (M_{8} \geq 3^{7} \times 2) ? 2 : (M_{8} \geq 3^{7}) ? 1 : 0, \quad M_{7} = M_{8} - T_{7} \times 3^{7}$$
$$T_{6} = (M_{7} \geq 3^{6} \times 2) ? 2 : (M_{7} \geq 3^{6}) ? 1 : 0, \quad M_{6} = M_{7} - T_{6} \times 3^{6}$$
$$T_{5} = (M_{6} \geq 3^{5} \times 2) ? 2 : (M_{6} \geq 3^{5}) ? 1 : 0, \quad M_{5} = M_{6} - T_{5} \times 3^{5}$$
$$T_{4} = (M_{5} \geq 3^{4} \times 2) ? 2 : (M_{5} \geq 3^{4}) ? 1 : 0, \quad M_{4} = M_{5} - T_{4} \times 3^{4}$$
$$T_{3} = (M_{4} \geq 3^{3} \times 2) ? 2 : (M_{4} \geq 3^{3}) ? 1 : 0, \quad M_{3} = M_{4} - T_{3} \times 3^{3}$$
$$T_{2} = (M_{3} \geq 3^{2} \times 2) ? 2 : (M_{3} \geq 3^{2}) ? 1 : 0, \quad M_{2} = M_{3} - T_{2} \times 3^{2}$$
$$T_{1} = (M_{2} \geq 3 \times 2) ? 2 : (M_{2} \geq 3) ? 1 : 0, \quad M_{1} = M_{2} - T_{1} \times 3$$
$$T_{0} = M_{1}$$

*FIG. 14*

FAREWELL RESET AND RESTART METHOD FOR COEXISTENCE OF LEGACY AND NEXT GENERATION DEVICES OVER A SHARED MULTI-MODE BUS

CROSS-REFERENCE TO RELATED APPLICATIONS

This application claims priority to and the benefit of U.S. Provisional Application Ser. No. 62/131,802, entitled "Farewell Reset And Restart Method For Coexistence Of Legacy And Next Generation Devices Over a Shared Multi-Mode Bus", filed on Mar. 11, 2015, and is a continuation in part of U.S. application Ser. No. 14/626,847, filed Feb. 19, 2015, which claims priority to U.S. Provisional Application Ser. No. 61/942,215, filed on Feb. 20, 2014, the entire contents of which are incorporated herein by reference.

FIELD

The present disclosure pertains to techniques to permit devices of different generations to coexist when coupled to a shared bus and, more particularly, to permit next-generation devices to disable legacy devices on the shared bus and bring them back into operation without a power cycling or bus reset.

BACKGROUND

The I2C standard (also referred to as $I^2C$) was defined by NXP for a multi-master serial single-ended bus used for attaching low-speed peripherals to a motherboard, embedded system, cellphone, cameras, or other electronic devices. The I2C bus includes a clock (SCL) and data (SDA) lines with 7-bit addressing. The bus has two roles for devices: master and slave. A master device is a node that generates the clock and initiates communication with slave devices. A slave device is a node that receives the clock and responds when addressed by the master device. The I2C bus is a multi-master bus which means any number of master devices can be present. Additionally, master and slave roles may be changed between messages (after a STOP is sent). I2C defines basic types of messages, each of which begins with a START and ends with a STOP.

Various multi-protocol methods have been proposed to achieve higher bandwidth over an I2C-compatible bus while still permitting I2C legacy devices to remain operational over the I2C-compatible bus. For example, the I3C standard (defined by the MIPI Alliance) is an evolution of the I2C standard and provides backward compatibility for I2C devices. However, it is foreseen that even higher bandwidth may be desirable over the same bus in the future. Achieving such higher bandwidths over the bus may be hindered by the operation of legacy devices, such as I2C device and I3C devices.

Therefore, a solution is needed that allows selectively disabling legacy devices in a system in which a bus is shared by both legacy devices and next generation devices to permit higher bandwidths over the shared bus.

SUMMARY

A first aspect provides a device, comprising a first bus, a second bus, a first set of devices, and a second set of devices. The first set of devices are coupled to the first bus and second bus, and the first set of devices configured to communicate over the first bus according to a first communication protocol. The second set of devices are coupled to the first bus, and the second set of devices configured to communicate over the first bus according to both the first communication protocol and a second communication protocol. In some implementations, some devices of the second set of devices (e.g., a next-generation master device and/or next-generation slave devices) may be coupled to the second bus. In a first mode of operation over the first bus, the first set of devices and second set of devices may concurrently communicate over the first bus using the first communication protocol. In a second mode of operation over the first bus, the second set of devices may communicate with each other using the second communication protocol over the first bus, and the first set of devices stop operating over the first bus. A disable command may be sent over the first bus (e.g., by a bus master device, possibly within the second set of devices) to cause the first set of devices to stop operating over the first bus while the second set of devices operate in the second mode over the first bus. An enable command is sent over the second bus (e.g., by the bus master device, possibly within the second set of devices) to cause the first set of devices to resume operating over the first bus while the first bus switches to operate in the first mode. The first communication protocol may provide a first data throughput over the first bus while the second communication protocol provides a second data throughput over the first bus, where the second data throughput may be greater than the first data throughput. The disable command prevents each of the first set of devices from receiving and transmitting over the first bus. Prior to or concurrent with entering the second mode of operation, at least one device from the second set of devices sends the disable command During the second mode of operation the first set of devices are unaffected by activity over the first bus.

In one implementation, the first bus includes a plurality of lines, with N lines allocated for transmissions in the first mode, and M lines being allocated for transmissions in the second mode, where N and M are integers greater than or equal to two (2). In some instances, the number of lines N and M may be different integers. In other instances, the number of lines N and M are the same integers and different number of logical transmission lanes are defined in the first and second modes.

A second aspect provides a legacy device, comprising: a first communication circuit, second communication circuit, and a control circuit. The first communication circuit to couple to a first bus and configured to communicate over the first bus according to a first communication protocol. The second communication circuit to couple to a second bus. The control circuit coupled to the first communication circuit and second communication circuit. The control circuit may be configured or adapted to: (a) configure the communication circuit to communicate over the first bus using the first communication protocol, (b) monitor the first bus for a disable command, (c) reconfigure the first communication circuit to ignore activity over the first bus upon detection of the disable command, (d) monitor the second bus for an enable command, and/or (e) reconfigure the first communication circuit to resume activity over the first bus upon detection of the enable command.

The first bus may include a plurality of lines, with N lines allocated for transmissions in the first mode, and M lines being allocated for transmissions in the second mode, where N and M are integers greater than or equal to two (2). In some instances, the plurality of lines N and M are different integers. In other instances, the plurality of lines N and M are the same integers and different number of logical transmission lanes are defined in the first and second modes. In one example, in the first mode N=2 to support CCIe-compatible transmissions and in the second mode M=3 to support three factorial (3!) multi-wire multi-level differential transmissions. In another example, in the first mode N=4 to support 4-wire single ended multi-wire transmissions and in the second mode M=2×2 to support transmissions over a first differential pair using two lines and a second differential pair using another two lines. In yet another example, in the first mode N=2×2 to support two differential wire pairs of CCIe-compatible transmissions and in the second mode M=4 to support four factorial (4!) multi-wire multi-level differential transmissions.

In another implementation, where N=M=3, in the first mode 3-wire single-ended transmissions are used, and in the second mode one pair of lines is used for differential transmissions and the remaining single line is used for sideband signaling.

A third aspect provides a next-generation device, configured as a bus master device, may comprise a first communication circuit, a second communication circuit, and/or a control circuit. The first communication circuit to couple to a first bus shared with other devices. The second communication circuit to couple to a second bus shared with the other devices. The control circuit may be coupled to the first communication circuit and the second communication circuit. The control circuit may be configured to: (a) configure the first communication circuit to operate in a first mode in which a first communication protocol is used over the first bus; (b) send a disable command over the first bus to indicate to other devices that do not support a second communication protocol to ignore activity over the first bus; (c) reconfigure the first communication circuit to operate in a second mode in which the second communication protocol is used over the first bus; (d) reconfigure the first communication circuit to operate in the first mode in which the first communication protocol is used over the first bus; and/or (e) send an enable command over a second bus to indicate to the other devices to resume activity over the first bus using the first protocol.

The disable command may prevent the other devices from communicating over the first bus. The disable command may be sent prior to or concurrent with the first communication circuit entering the second mode.

DRAWINGS

Various features, nature, and advantages may become apparent from the detailed description set forth below when taken in conjunction with the drawings in which like reference characters identify correspondingly throughout.

FIG. 12 illustrates a general example of converting a ternary number (base-3 number) to a binary number, where each T in {T11, T10, . . . T2, T1, T0} is a symbol transition number.

FIG. 13 illustrates an exemplary method for converting a binary number (bits) to a 12 digit ternary number (base-3 number).

FIG. 14 illustrates an example of one possible implementation of the division and the module operations of the FIG. 13, which may be synthesizable by any commercial synthesis tools.

DETAILED DESCRIPTION

Figure 1:
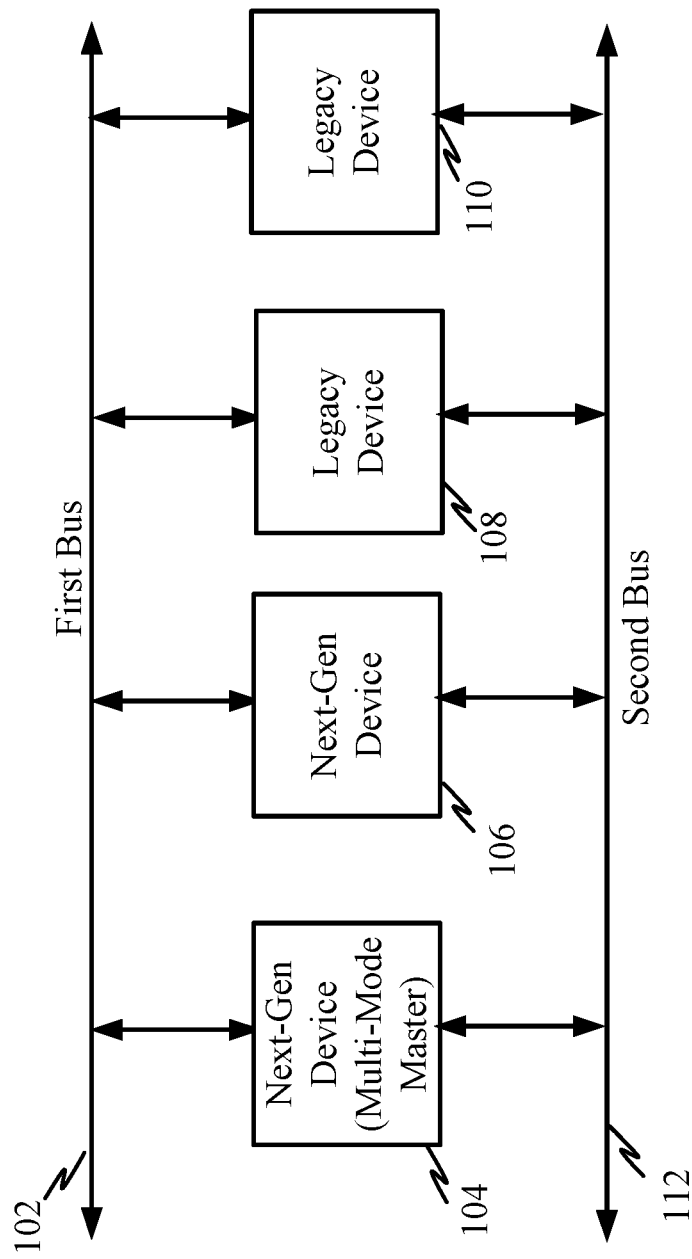
FIG. 1 is a block diagram illustrating an example of a first bus and a second bus shared by legacy devices and next-generation devices.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

In a system in which next-generation devices and legacy devices share a first bus, a feature is provided that permits the next-generation devices to selectively disable or sleep the legacy devices (or at least the bus interfaces of the legacy devices) in order to improve performance (e.g., increase bandwidth or transmission rates) over the bus. A first set of devices (e.g., legacy devices, I2C-compatible devices, I3C-compatible devices, etc.) may be configured to communicate over the first bus according to a first communication protocol. A second set of devices (e.g., next-generation devices) may be configured to communicate over the first bus according to both the first communication protocol and a second communication protocol. In a first mode of operation, the first set of devices and second set of devices may concurrently communicate over the first bus using the first communication protocol. In a second mode of operation, the second set of devices communicate with each other using the second communication protocol over the first bus, and the first set of devices stop operating over the first bus. For instance, at least one device from the second set of devices may cause the first set of devices to enter a disabled mode and the second set of devices communicate with each other using the second communication protocol. Consequently, in the second mode, the first set of devices ignore activity (e.g., do not transmit and ignore most commands) over the bus.

In one example, the first communication protocol provides a first data throughput (e.g., bandwidth or transmission rate) over the bus while the second communication protocol provides a second data throughput over the bus, where the second data throughput is generally greater than the first data throughput. In another example, the second communication protocol may be slower (e.g., less data throughput) than the first communication protocol, but the second protocol may be chosen for lower power consumption using, for instance, some DC level which the first communication protocol cannot accept.

During the first mode of operation, at least one of the second set of devices sends a disable command or a sleep command over the first bus to cause the first set of devices to stop operating over the first bus.

The system may also include a second or secondary bus, distinct from the first bus, to which the next-generation devices (i.e., second set of devices) and legacy devices (i.e., first set of devices) are also coupled. In order to wake up the second set of devices after a disable command has been sent over the first bus, a master device may make use of the second or secondary bus to send an enable command to the second set of devices. That is, while the first set of devices may have disabled communications over the first bus, they may still remain operational over the second or secondary bus. Upon reception of an enable command over the second or secondary bus, each device in the first set of devices may be configured to activate its interface to/from the first bus and start communicating over the first bus (e.g., using the first protocol). In various implementations, while in the second mode of operation, the first bus and/or the second bus may be used to inform slave next-generation devices (e.g., in the second set of devices) to switch back to the first mode. Note that the second or secondary bus permits re-enabling operation of the first set of devices without the need for power cycling or a hardware reset. In one example, the first bus may be a data bus and the second bus may be a control bus.

Exemplary Operating Environment

FIG. 1 is a block diagram illustrating an example of a first bus 102 and a second bus 112 shared by legacy devices 108 and 110 and next-generation devices 104 and 106. In one example, the legacy devices 108 and 110 may be CCIe-compatible devices (described below), I2C-compatible devices, and/or I3C-compatible devices while the next-generation devices 104 and 106 may be post-CCIe devices and/or post-I3C devices. CCIe-compatible devices, as described below, may be an evolution or extension of the Camera Control Interface specified by MIPI. Such next-generation devices 104 and 106 may have improved performance over the first bus 102 or features relative to the legacy devices 108 and 110 (e.g., may operate faster, or include improved capabilities).

The legacy devices 108 and 110 and next-generation devices 104 and 106 may also share a separate second bus 112, distinct from the first bus. For example, the first bus 102 may be a control bus while the second bus 112 may be a data bus.

In some modes of operation, it may be desirable to share the first bus 102 between the legacy devices 108 and 110 and next-generation devices 104 and 106 (e.g., for backward compatibility). In such modes of operation, the next-generation devices 104 and 106 may be operated at a reduced performance level in order to accommodate operation of the legacy devices 108 and 110.

In other modes of operation, it may be desirable to improve performance over the first bus by disabling the legacy devices 108 and 110 (or at least the bus interfaces of the legacy devices to the first bus), thereby permitting the next-generation devices 104 and 106 to operate to their full capabilities over the first bus without concern for the legacy devices 108 and 110.

A master device may send a disable command to the legacy devices 108 and 110 to cause the legacy devices 108 and 110 to stop receiving and/or transmitting over the first bus. In one implementation, the legacy devices 108 and 110 may be reset by power cycling them to start communicating (e.g., listening and/or transmitting) over the first bus 102. However, because such power reset of legacy devices is time/resource intensive, another implementation provides for an enable command to be sent via the second bus 112. Upon detection of an enable command over the second bus 112, the legacy devices 108 and 110 may renew use of the first bus (e.g., receiving and/or transmitting over the first bus according to the first protocol).

Figure 2:
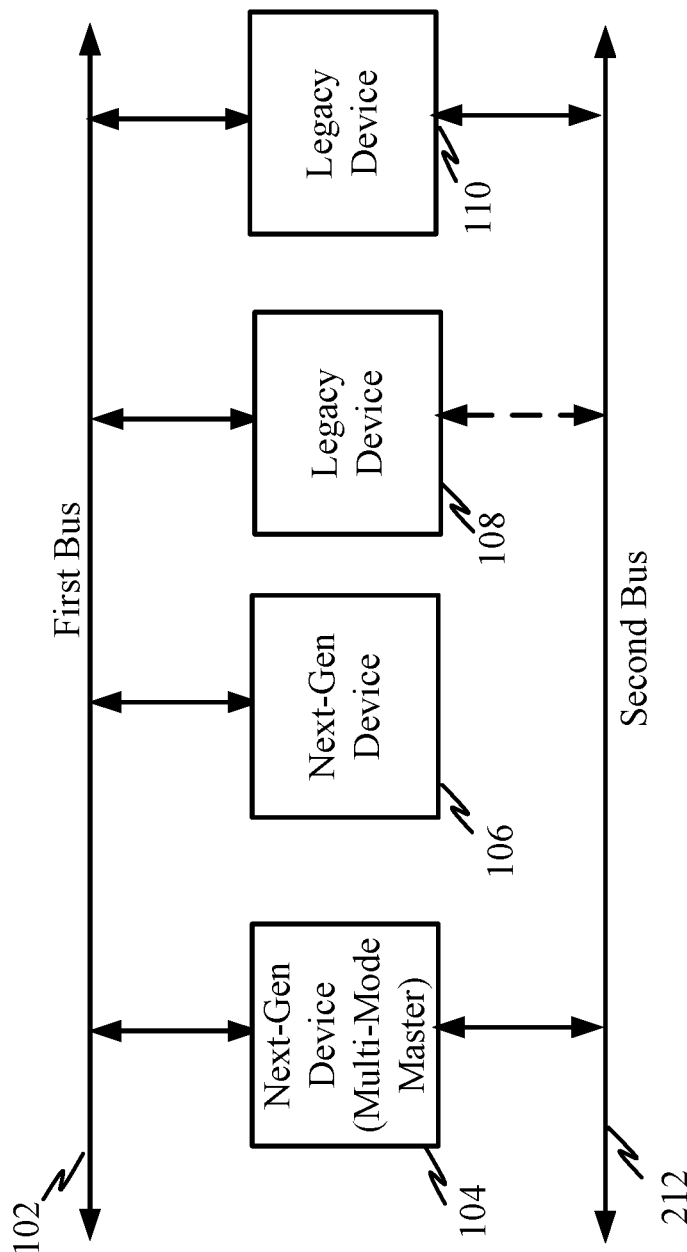
FIG. 2 is a block diagram illustrating another implementation of the device in FIG. 1 in which the second bus may be coupled between a master device and some or all of the legacy devices.

In this example, a first next-generation device 104 may serve as a multi-mode master device, being able to control communications over the first bus 102 according to both the first protocol and/or the second protocol. While operating as a master device over the first bus 102, the first next-generation device 104 may be capable of sending both a disable command to the legacy devices 108 and 110 over the first bus 102 as well as an enable command to the legacy devices 108 and 110 over the second bus 112. FIG. 2 is a block diagram illustrating another implementation of the device in FIG. 1 in which the second bus 212 may be coupled between a master device 104 and some or all of the legacy devices 108 and 110. In one example, the first bus 102 may be a two-line bus.

Figure 3:
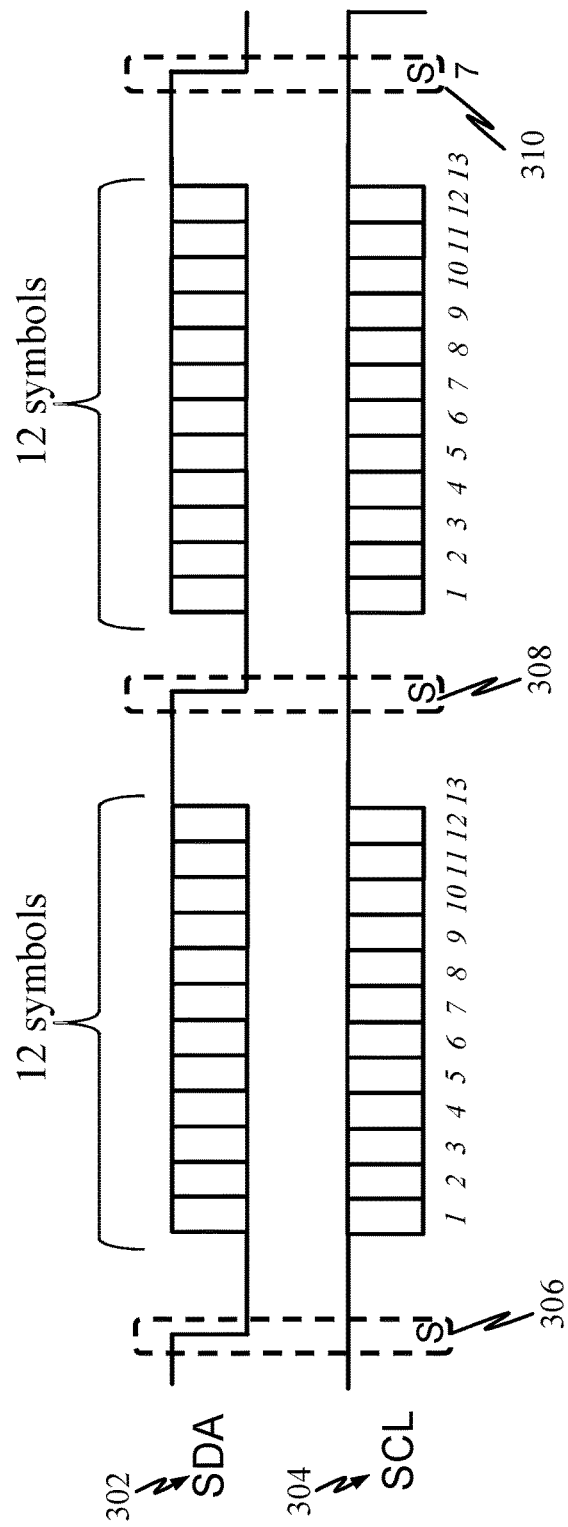
FIG. 3 illustrates how both wires/lines of a shared first bus may be utilized for data transmission in a first mode.

FIG. 3 illustrates how both wires/lines of a shared first bus (e.g., first bus 102) may be utilized for data transmission in a first (CCIe) mode. For instance, first bus 102 may include a first line (SDA) 302 and a second line (SCL) 304. In one implementation, a clock signal may be embedded within symbol transitions (as discussed further below). The SDA line 302 and SCL line 304 may each transmit any arbitrary number of symbols between two consecutive START conditions 306, 308 and 310 from the legacy devices (e.g., CCIe-capable nodes/devices).

In one example, a CCIe word may be sent in 12-symbols that carry 20-bits information. In one implementation, sixteen (16) bits of the 20-bits may be for data information while 4 bits of the 20-bits may be used for other information such as control information.

Exemplary Approach to Disable Legacy (CCIe) Devices

Figure 4:
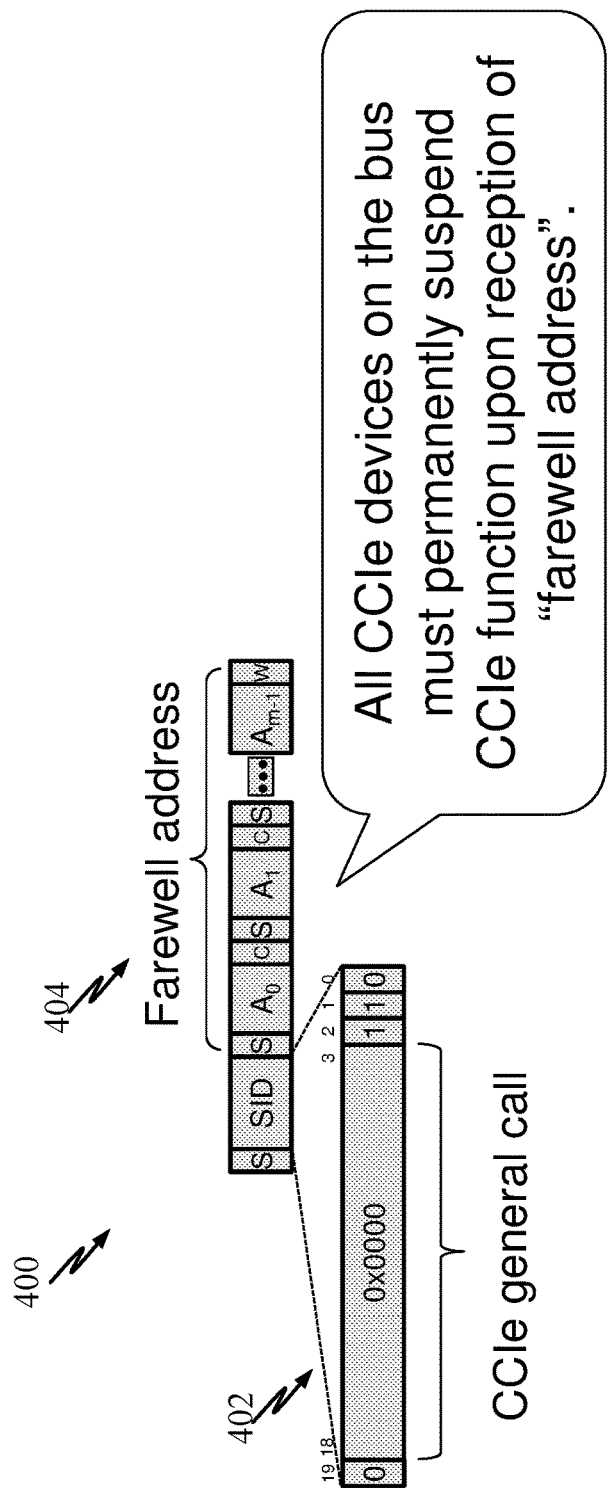
FIG. 4 illustrates an exemplary general call that may be used to place the legacy devices (or at least their interface to the bus) into a disable mode (e.g., suspend, stop, or kill mode so legacy devices do not wakeup).

FIG. 4 illustrates an exemplary general call that may be used to place the legacy (CCIe) devices (or at least their interface to the bus) into a disable mode (e.g., suspend, stop, or kill mode so legacy devices do not wakeup). That is, such disable mode may be used when the legacy devices will not be subsequently awoken (except through a power reset or a reboot or other mechanism that does not utilize the first bus).

For instance, a next-generation device 104 or 106 (operating as a master device relative to the first bus 102) may send a farewell/disable command/call 400 over the shared first bus 102 which causes the legacy devices 108 and 110 to become disabled until a power reset occurs or an enable command is received over a second bus 112 or 212. The farewell/disable command/call 400 may include a general call identifier portion 402, an address portion 404 that is specifically selected to disable the legacy (CCIe) devices 108 and/or 110. The farewell address portion 404 is selected so that no legacy device 108 and/or 110 accidentally interprets it as valid address. Instead, such farewell address 404 is interpreted and processed as a farewell/disable command/call by the legacy devices 108 and 110. The farewell address may be a compact and simple code to avoid large hardware overhead when decoding at the legacy devices.

The farewell/disable command/call 400 may be sent, for example, by a master device (e.g., a next-generation device 104 or 106 operating as a master for communications over the shared first bus 102). When receiving/detecting such farewell/disable command/call 400, next-generation devices may be configured to switch to a different mode (e.g., a mode in which the next-generation devices operate according a different communication protocol, transmit speed, etc.). For example, upon receipt of the farewell/disable command/call 400, next-generation devices may change their input/output specifications (e.g. input/output level, slew-rate, etc.) from a first protocol to a second protocol.

Once placed in the disable mode, the legacy devices 108 and/or 110 do not receive or transmit over the shared first bus 102. Consequently, the legacy devices 108 and/or 110 may not communicate over the first bus 102 unless they are reset or otherwise enabled. Resetting or power cycling a legacy device is disfavored because it also means resetting the first bus, which is time consuming Instead, an enable command/call may be sent by a next-generation device via the second bus 112 to enable, reanimate, or wake-up the legacy devices from the disable mode. Such enable command/call may be designed to cause the receiving legacy device to enable a communication interface of the legacy device 108 and/or 110 so that it can again receive and/or transmit over the first bus 102. Occurrence of such enable command or call may also cause the next-generation devices 104 and/or 106 to switch to an operating mode that permits coexistence with the legacy devices 108 and/or 110 over the shared first bus 102 (e.g., switch from the second protocol to the first protocol). In alternative implementations, the next-generation devices 106 may not be coupled to the second bus 112 and may receive command to switch to the second protocol over the first bus 102 when the master device 104 switches back to the first protocol.

Exemplary Operation of Next Generation Device

Figure 5:
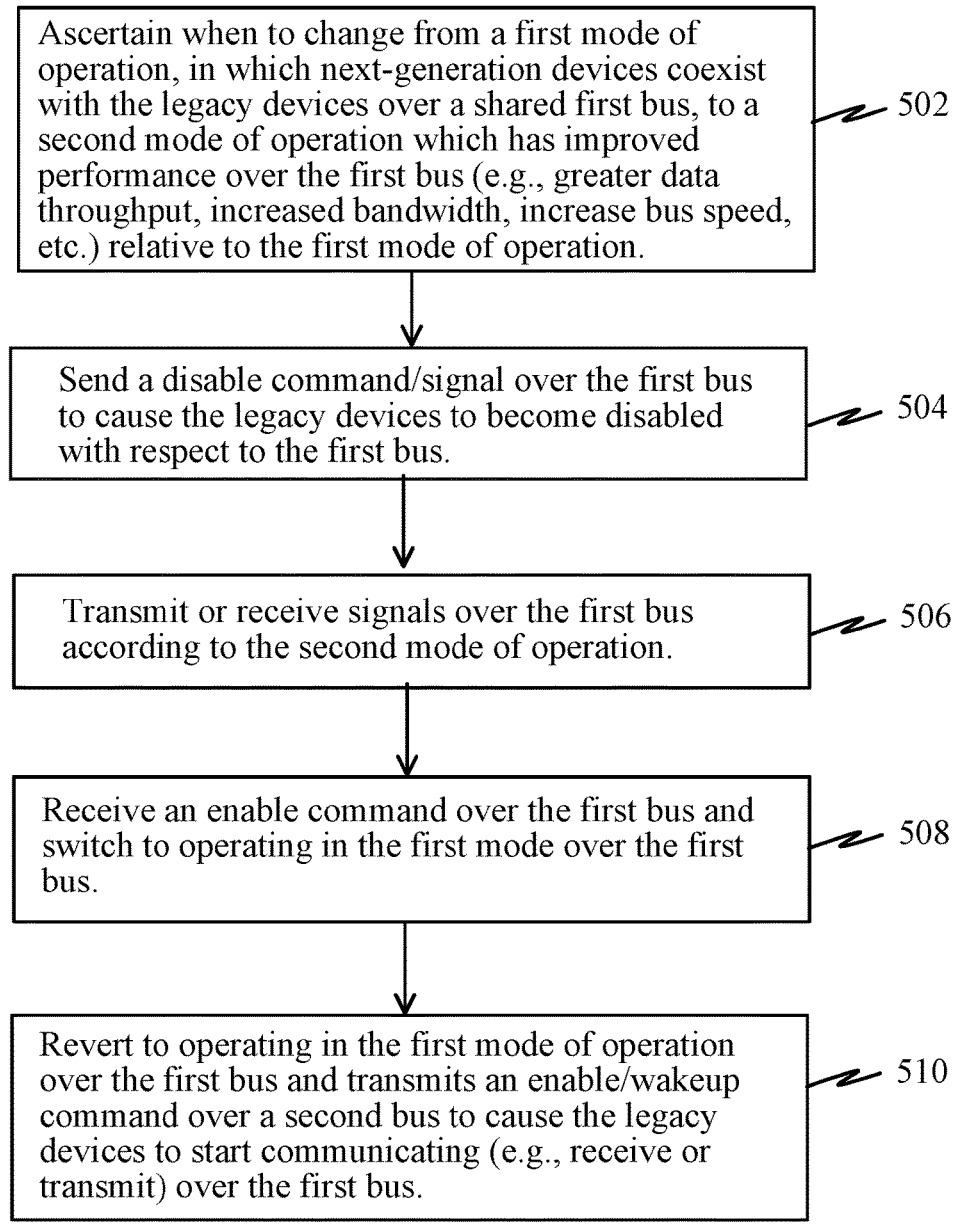
FIG. 5 illustrates a method operational at a next generation device to disable legacy devices from operating over a shared first bus and subsequently re-enable operation of the legacy devices via a second bus.

FIG. 5 illustrates a method operational at a next generation device to disable legacy devices (e.g., CCIe-compatible devices) from operating over a shared first bus and subsequently re-enable operation of the legacy devices via a second bus. A next generation device may ascertain when to change from a first mode of operation, in which it coexists with the legacy devices on the first bus, to a second mode of operation which has improved performance over the first bus (e.g., greater data throughput, increased bandwidth, increase bus speed, etc.) relative to the first mode of operation 502. The next generation device may then send a disable command/signal over the first bus to cause the legacy devices to become disabled with respect to the first bus 504. In disabled mode, the legacy devices may ignore all transmissions over the first bus (i.e., do not receive or transmit over the first bus).

The next generation device may then transmit or receive signals over the first bus according to the second mode of operation 506.

In some implementations, the next generation device may receive an enable command over the first bus and switches to operating in the first mode over the first bus 508.

In some instances, the next generation device may revert to operating in the first mode of operation over the first bus and transmits an enable command over a second bus to cause the legacy devices to start communicating (e.g., receive or transmit) over the first bus 510. For instance, such enable command may be sent by a next generation master device.

Exemplary Operation of Legacy Device

Figure 6:
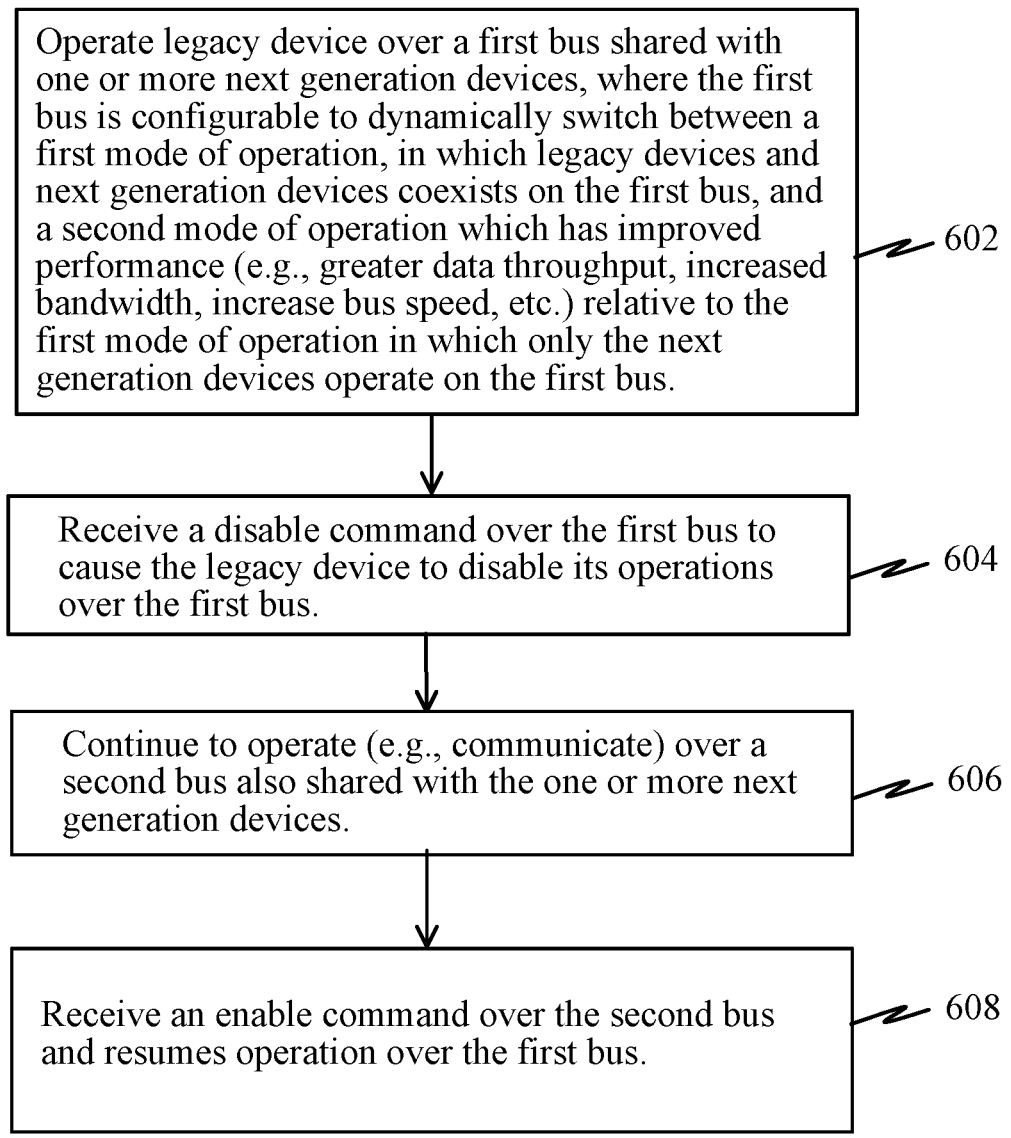
FIG. 6 illustrates a method operational at a legacy device to operate over a shared first bus with next generation devices.

FIG. 6 illustrates a method operational at a legacy device to operate over a shared first bus with next generation devices. The legacy device may be coupled to one or more next generation devices over a first bus and a second bus.

The legacy device may operate over the first bus shared with one or more next generation devices, where the first bus is configurable to dynamically switch between a first mode of operation, in which legacy devices and next generation devices coexists on the first bus, and a second mode of operation which has improved performance (e.g., greater data throughput, increased bandwidth, increase bus speed, etc.) relative to the first mode of operation in which only the next generation devices operate on the first bus 602. The legacy device may receive a disable command (e.g., from a master device controlling the first bus) over the first bus to cause the legacy device to disable its operations over the first bus 604.

Even when the legacy device has disabled its operations over the first bus, it continues to operate (e.g., communicate) over the second bus also shared with the one or more next generation devices 606. Subsequently, the legacy device may receive an enable command over the second bus and resumes operation over the first bus 608.

Exemplary Operation of Next-Generation and Legacy Devices Over Shared Bus

Figure 7:
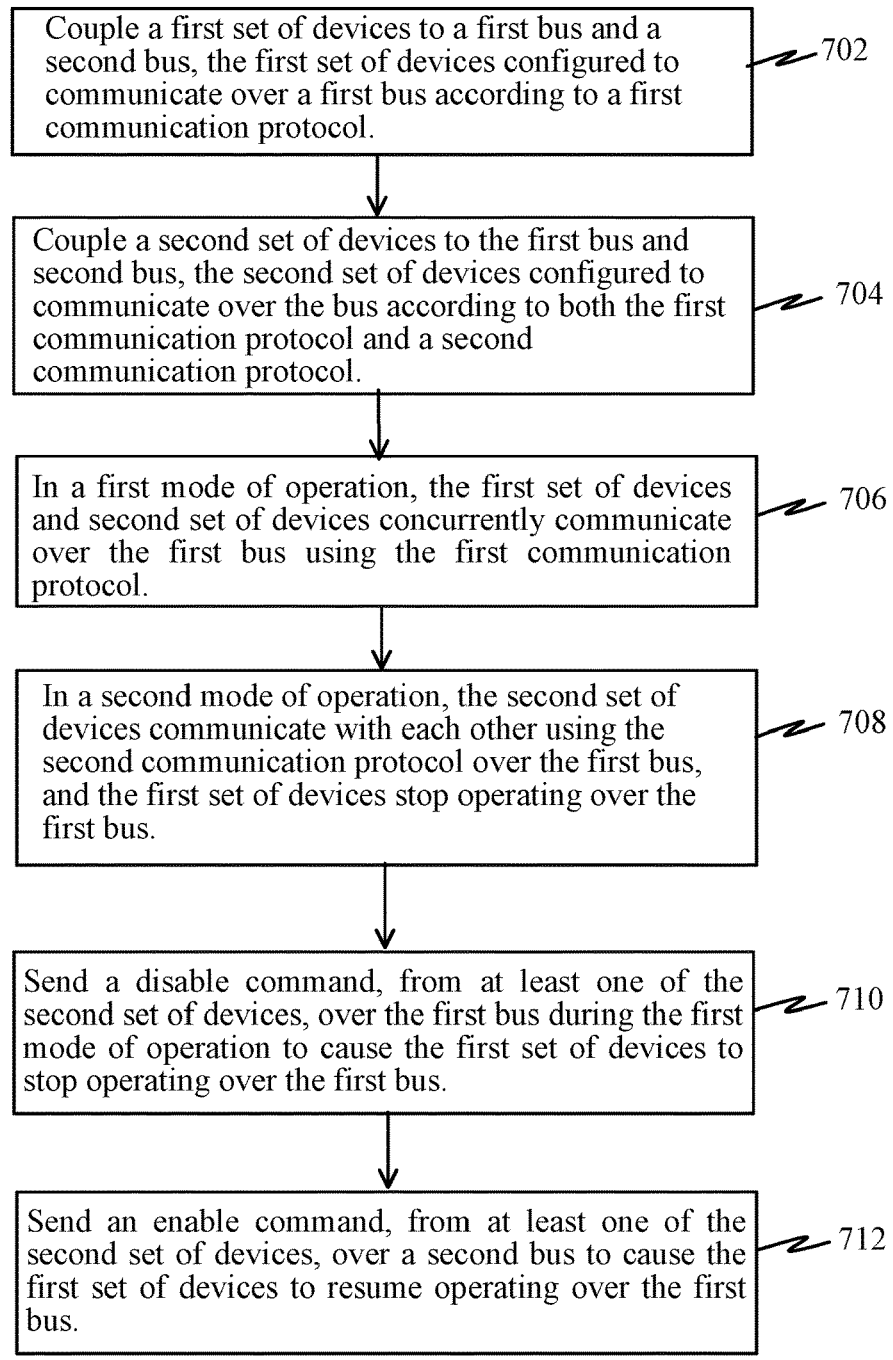
FIG. 7 illustrates a method that permits a next generation device to disable and re-enable legacy devices sharing the same first bus.

FIG. 7 illustrates a method that permits a next generation device to disable and re-enable legacy devices sharing the same first bus. A first set of devices (e.g., legacy devices) may be coupled to a first bus, the first set of devices configured to communicate over the bus according to a first communication protocol 702. A second set of devices (e.g., next generation devices) may be coupled to the first bus, the second set of devices configured to communicate over the first bus according to both the first communication protocol and a second communication protocol 704. In a first mode of operation, the first set of devices and the second set of devices may concurrently communicate over the bus using the first communication protocol 706. In a second mode of operation the second set of devices communicate with each other using the second communication protocol over the bus, and the first set of devices stop operating (e.g., stop receiving and/or transmitting) over the first bus 708.

That is, during the second mode of operation the first set of devices are unaffected by bus activity (e.g., ignore all or most transmissions on the bus and/or do not transmit over the bus). For example, prior to or concurrent with entering the second mode of operation, at least one device from the second set of devices may cause the first set of devices to enter a sleep or disabled mode. For instance, a disable command may be sent from at least one of the second set of devices over the first bus during the first mode of operation to cause the first set of devices to stop operating over the first bus 710.

The first communication protocol may provide a first data throughput over the first bus while the second communication protocol provides a second data throughput over the first bus, where the second data throughput is greater than the first data throughput.

In one example, the first bus may include two lines. In the first mode of operation, signals may be transmitted over the two lines and a clock signal may be embedded in symbol-to-symbol transitions of the plurality of symbols within the signals.

In another example, the first bus may include a plurality of lines and the number of lines used may be dynamically allocated/adjusted depending on the mode of operation of the first bus. For example, the first bus may use N lines in a first mode and M lines in a second mode, where N and M are different integer numbers. Alternatively, the first bus may use N lines in a first mode and M lines in a second mode, where N and M is the same integer number, but with different number of logical lanes used in the first mode and second mode.

In yet another example, the first bus may have a first mode in which two lines (N=2) are used for transmissions (e.g., CCIe-compatible transmissions), and a second mode in which three lines (M=3) are used for transmissions (e.g., three factorial (3!) multi-wire multi-level differential transmissions).

In yet another example, the first bus may use the same number of lines in the first mode and second mode but with different encodings in each mode. For instance, the first bus may operate in a first mode in which four lines (N=4) are used for transmissions (e.g., 4-wire single ended multi-wire ($2^4$-1 states per symbol)), and a second mode in which two pairs of differential lines (M=2×2) are used for transmissions (e.g., a first differential pair over two lines and a second differential pair over another two lines).

In yet another example, the first bus may operate in a first mode in which two pairs of differential lines (N=2×2) are used for transmissions according to a first encoding (e.g., two lanes of CCIe-compatible transmissions), and a second mode in which four lines (M=4) are used for transmissions (e.g., four factorial (4!) multi-wire multi-level differential transmissions).

In yet another example, the first bus may use the same number of lines in the first and second modes, but for different purposes. For instance, the first bus may use three (3) lines in a first mode for transmitting data (e.g., 3-wire single-ended transmissions), and in a second mode may use two lines for transmitting data (e.g., one pair of lines for differential transmissions) plus a single line for sideband signaling (e.g., a legacy device command line to disable legacy devices when the first bus operates in the second mode).

During the first mode of operation, at least one of the second set of devices sends a disable command over the first bus to cause the first set of devices to stop from operating (or communicating) over the first bus.

The disable command prevents each of the first set of devices from communicating over the first bus until either a power on reset or hardware reset of the first set of devices or an enable command is send to the first set of devices via a different channel than the first bus. While in the disabled mode, a legacy device may disable operation of a bus interface from receiving and/or transmitting over the first bus. In another example, the disable command may disable operation of each device within the first set of devices.

Each of the first set of devices may include a receiver device capable of at least partially decoding signals on the bus using just a clock signal embedded within signals transmitted according to the first communication protocol. The receiver device may enter into a disabled mode upon receipt of a disable command over the first bus. The receiver device may resume operation over the first bus upon receipt of an enable command over the second bus. For instance, an enable command may be sent from at least one of the second set of devices over a second bus to cause the first set of devices to resume operating over the first bus 712. In various examples, the second bus may be one or more channels or communication lines, distinct from the first bus, between at least one of the second set of devices and one or more of the first set of devices. In some implementations, the second bus may operate according to a different protocol than either the first or second protocols used over the first bus.

The first communication protocol may be, for example, one of a camera control interface extended (CCIe) protocol or an I2C protocol.

Exemplary Transcoding Technique for Legacy (CCIe) Devices

Figure 8:
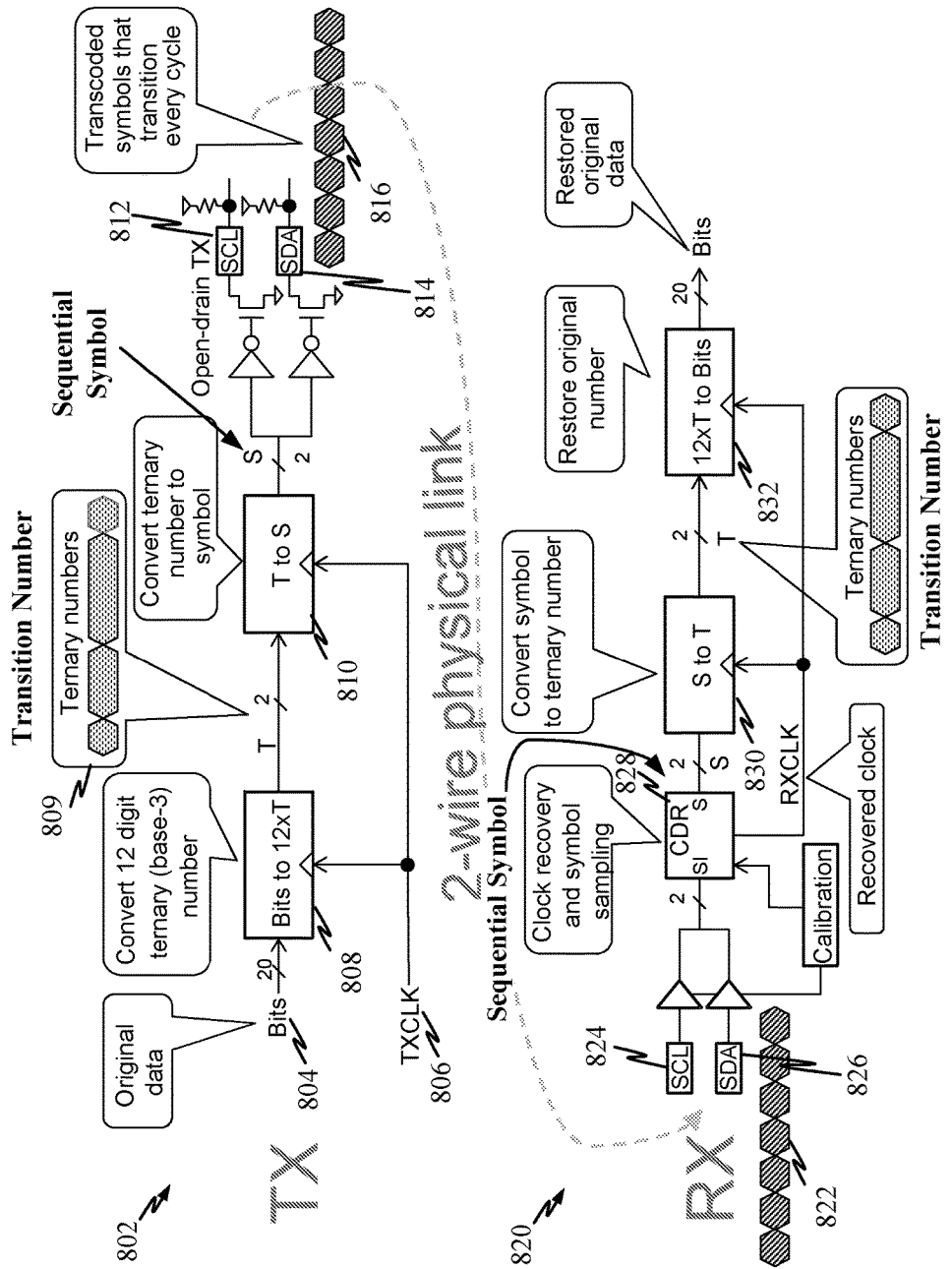
FIG. 8 is a block diagram illustrating an exemplary method for transcoding of data bits into sequential symbols at a transmitter to embed a clock signal within the sequential symbols.

FIG. 8 is a block diagram illustrating an exemplary method for transcoding of data bits into sequential symbols at a transmitter to embed a clock signal within the sequential symbols. At the transmitter 802, a sequence of data bits 804 are converted into a ternary (base 3) number (e.g., where each individual digit of the ternary number is referred to as a "transition number"), and the ternary numbers are converted into sequential symbols which are transmitted over a control data bus that includes a clock line SCL 812 and a data line SDA 814.

In one example, an original 20-bits 804 of binary data is input to a bit-to-transition number converter block 808 to be converted to a 12-digits ternary number 809. Each digit of a 12-digits ternary number may represent a "transition number". Two consecutive digits of a transition number may be the same digit value. Each digit of a transition number is converted into a sequential symbol at a transition-to-symbol block 810 such that no two consecutive sequential symbols have the same value. Because a transition (e.g., change) is guaranteed at every sequential symbol, such sequential symbol transition may serve to embed a clock signal. Each sequential symbol 816 is then sent over a two wire physical link (e.g., I2C control data bus comprising a SCL line 812 and a SDA line 814).

At a receiver 820 the process is reversed to convert the sequential symbols back to bits and, in the process, a clock signal is extracted from the sequential symbol transition. The receiver 820 receives the sequential symbols 822 over the two wire physical link (e.g., an I2C control data bus comprising a SCL line 824 and a SDA line 826). The received sequential symbols 822 are input into a clock-data recovery (CDR) block 828 to recover a clock timing and sample the sequential symbols (S). A symbol-to-transition number converter block 830 then converts each sequential symbol to a transition number, where each transition number represents a digit of a ternary number. Then, a transition number-to-bits converter 832 converts twelve (12) transition numbers (i.e., a ternary number) to restore twenty (20) bits of original data from the 12 digit ternary number.

Figure 10:
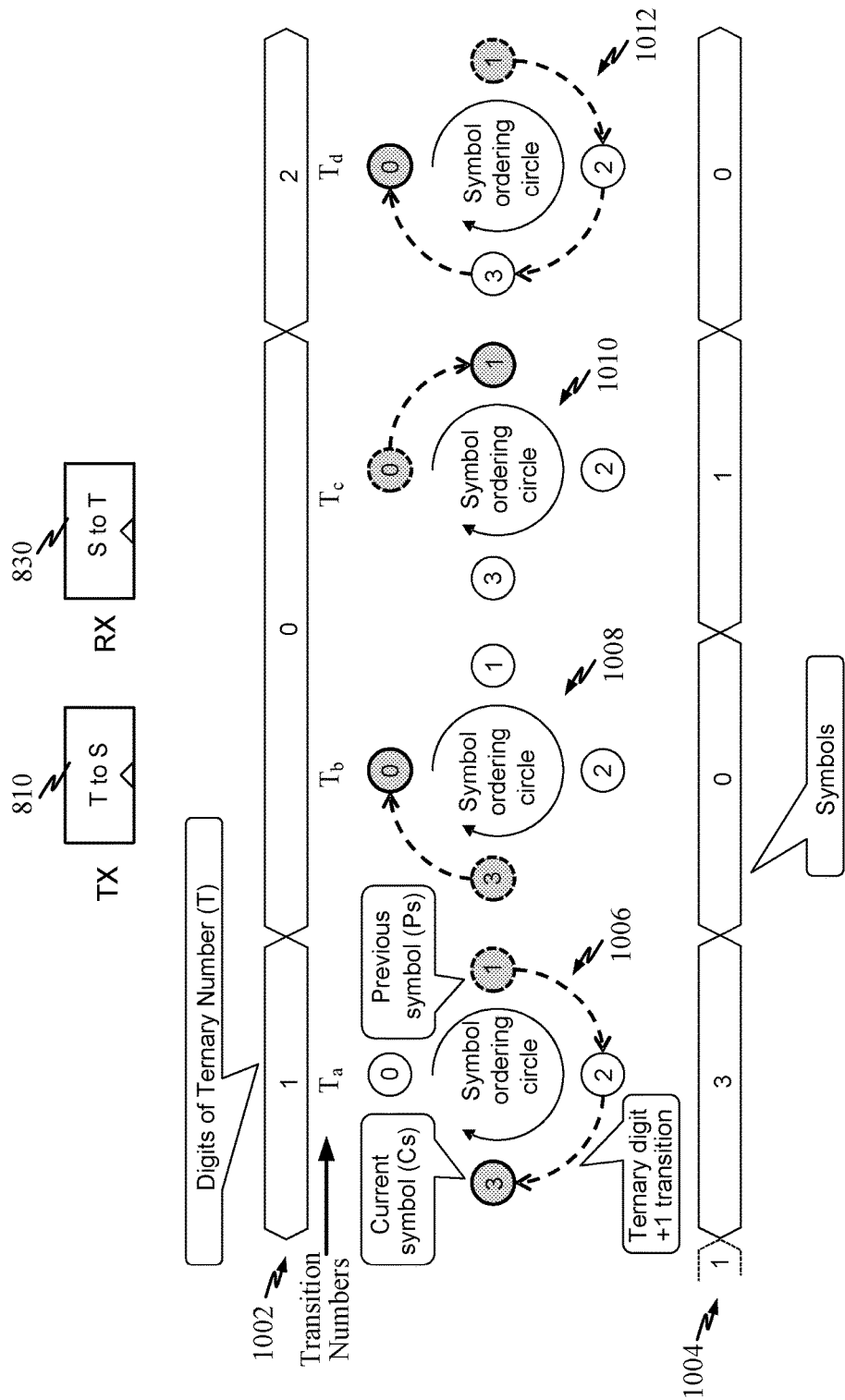
FIG. 10 illustrates an exemplary conversion between transition numbers and sequential symbols.

The technique illustrated herein may be used to increase the link rate of a control data bus 102 (FIG. 1) and 208 (FIG. 2) beyond what the I2C standard control data bus provides and is referred hereto as CCIe mode. In one example, a master node/device and/or a slave node/device coupled to the control data bus 102 and 208 may implement transmitters and/or receivers that embed a clock signal within sequential symbol changes/transitions (as illustrated in FIG. 10) in order to achieve higher bit rates over the same control data bus than is possible using a standard I2C control data bus.

Figure 9:
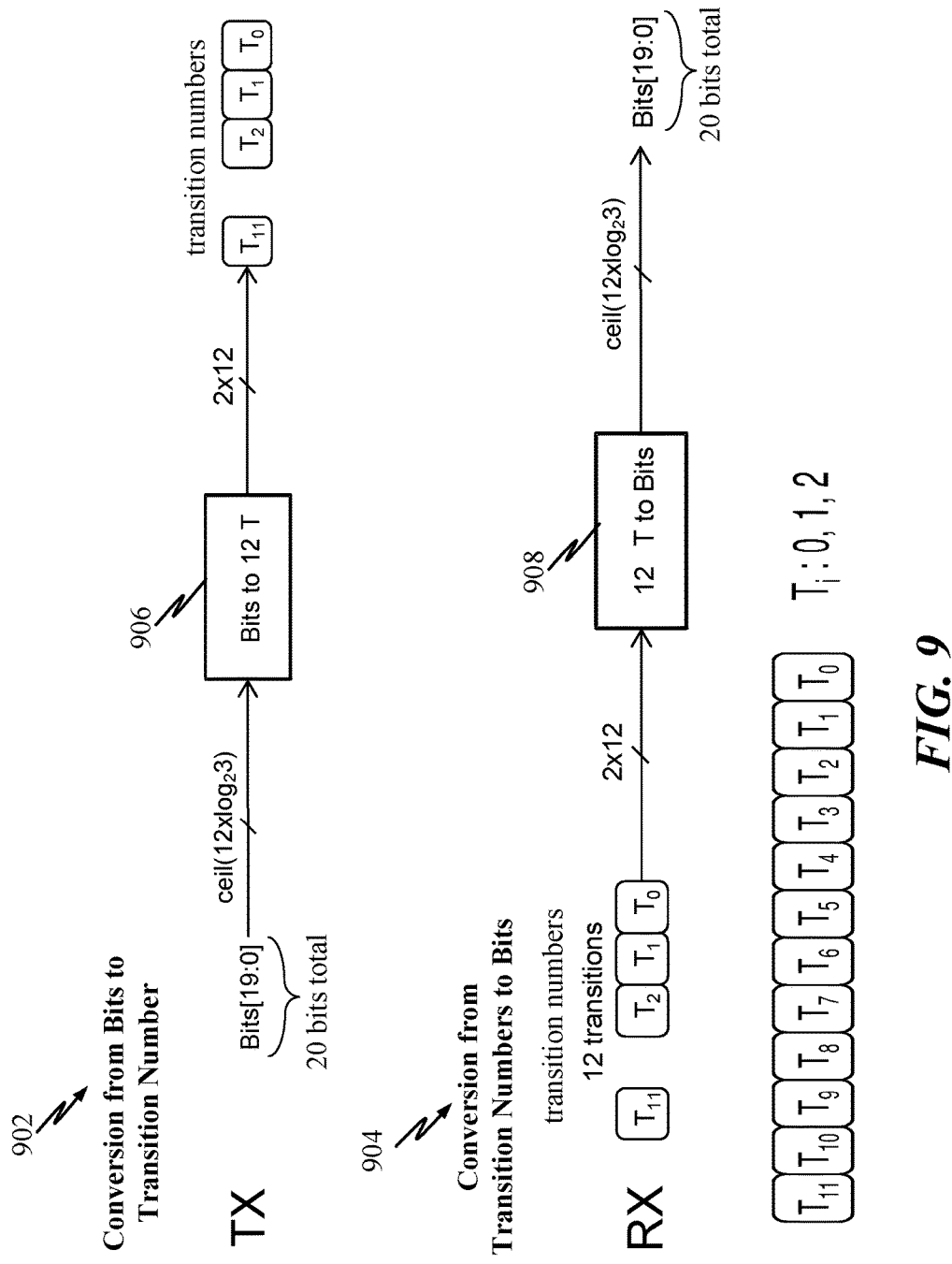
FIG. 9 illustrates an exemplary conversion from bits to transition numbers at a transmitter and then from transition numbers to bits at a receiver.

FIG. 9 illustrates an exemplary conversion from bits to transition numbers at a transmitter 902 and then from transition numbers to bits at a receiver 904. This example illustrates the transmission for a 2-wire system using 12 transition symbols. The transmitter 902 feeds binary information, Bits, into a "Bits to 12×T" converter 906 to generate 12 symbol transition numbers, T0 to T11. The receiver 904 receives 12 symbols transition numbers, T0 to T11, which are fed into a "12×T to Bits" converter 908 to retrieve the binary information (Bits). If there are r possible symbol transition states per one T, T0 to T11, 12 transitions can send $r^{12}$ different states. For a 2-wire bus, $r=2^2-1$. Consequently, transitions T0 ... T11 contain data that can have $(2^2-1)^{12}$ different states. Consequently, r=4−1=3 and the number of states=(4−1)^12=531441.

In this example for a 2-wire system using 12 symbol transition numbers, it may be assumed that the possible symbol transitions per one T, r is 3 ($=2^2-1$). If the number of symbols in a group is 12, a 12-digit ternary number (base-3 number): T11, T10, ..., T2, T1, T0, where each Ti: 0, 1, 2, may be used. For example, for {T11, T10, ... T2, T1, T0}={2, 1, 0, 0, 1, 1, 0, 1, 0, 1, 2, 1}, the ternary number is:

$$2100\_1101\_0121_3 \text{(Ternary number)} = 2 \times 3^{11} + 1 \times 3^{10} + 0 \times 3^9 + 0 \times 3^8 +$$
$$1 \times 3^7 + 1 \times 3^6 + 0 \times 3^5 + 1 \times 3^4 +$$
$$0 \times 3^3 + 1 \times 3^2 + 2 \times 3^1 + 1 \times 3^0$$
$$= 416356(0 \times 65A64).$$

In this manner, 12 transitions numbers may be converted into a number. Note that the ternary number 2100_1101_01213 may be used as the transition number, for example, in FIG. 8, so that each integer may be mapped to a sequential symbol and vice versa. When sending 2100_1101_01213 in inverse order, the Ts are sent in decreasing order of power, i.e., T11 is the digit to be multiplied by $3^{11}$ so it is of the eleventh power and so forth.

The example illustrated in FIG. 8 for a 2-wire system and 12 symbol transition numbers may be generalized to an n-wire system and m symbol transition numbers. If there are r possible symbol transition states per one T, T0 to Tm−1, m transitions can send $r^m$ different states, i.e., $r=2^n-1$. Consequently, transitions T0 ... Tm−1 contain data that can have $(2^n-1)^m$ different states.

FIG. 10 illustrates an exemplary conversion between transition numbers 1002 and sequential symbols 1004. An individual digit of ternary number, base-3 number, also referred to as a transition number, can have one of the three (3) possible digits or states, 0, 1, or 2. While the same digit may appear in two consecutive digits of the ternary number, no two consecutive sequential symbols have the same value. The conversion between a transition number and a sequential symbol guarantees that the sequential symbol always changes (from sequential symbol to sequential symbol) even if consecutive transition numbers are the same.

In one example, the conversion function adds the transition number (e.g., digit of a ternary number) plus 1 to the previous raw sequential symbol value. If the addition results in a number larger than 3, it rolls over from 0, then the result becomes the state number or value for the current sequential symbol.

In a first cycle 1006, a previous sequential symbol (Ps) is 1 when a first transition number ($T_a$) 1 is input, so the first transition number 1 plus 1 is added to the previous sequential symbol (Ps), and the resulting current sequential symbol (Cs) of 3 becomes the current sequential symbol that is sent to the physical link.

In a second (next) cycle 1008, a second transition number ($T_b$) of 0 is input, and the second transition number 0 plus 1 is added to the previous sequential symbol (Ps) of 3. Since the result of the addition (0+1+3) equals 4, is larger than 3, the rolled over number 0 becomes the current sequential symbol (Cs).

In a third cycle 1010, a third transition number (Ta) of 0 is input. The conversion logic adds the third transition number 0 plus 1 to the previous sequential symbol (Ps) 0 to generate current sequential symbol (Cs) 1.

In a fourth cycle 1012, a fourth transition number ($T_d$) of 2 is input. The conversion logic adds the fourth transition number ($T_d$) 2 plus 1 to the previous symbol (Ps) 1 to generate current sequential symbol (Cs) 0 (since the result of the addition, 4, is larger than 3, the rolled over number 0 becomes the current sequential symbol).

Consequently, even if two consecutive ternary digits $T_b$ and $T_c$ have the same number, this conversion guarantees that two consecutive sequential symbols have different state values. Because of this conversion, the guaranteed sequential symbol change or transition in the sequence of symbols 1004 may serve to embed a clock signal, thereby freeing the clock line SCL in an I2C control data bus for data transmissions.

Note that while this example of transition number to sequential number conversions adds a guaranteed number "1" to increment between consecutive sequential symbols, other values may be used in other implementations to guarantee a transition or change between sequential symbols.

Referring again to FIG. 8, at the receiver 820 the process illustrated in FIG. 10 is reversed to convert the sequential symbols back to bits and, in the process, a clock signal is extracted from the symbol transition. The receiver 820 receives sequential symbols 822 over the two wire physical link (e.g., I2C bus comprising a SCL line 824 and a SDA line 826). The received sequential symbols 422 are input into a clock-data recovery (CDR) block 828 to recover a clock timing and sample the transcoded symbols (S). A symbol-to-transition number converter block 830 then converts each sequential symbol to a transition number, i.e., which makes up a digit within a ternary number. Then, a transition number-to-bits converter 32 converts 12 transition numbers (i.e., a ternary number) to restore 20 bits of original data from the 12 digit ternary number.

Figure 11:
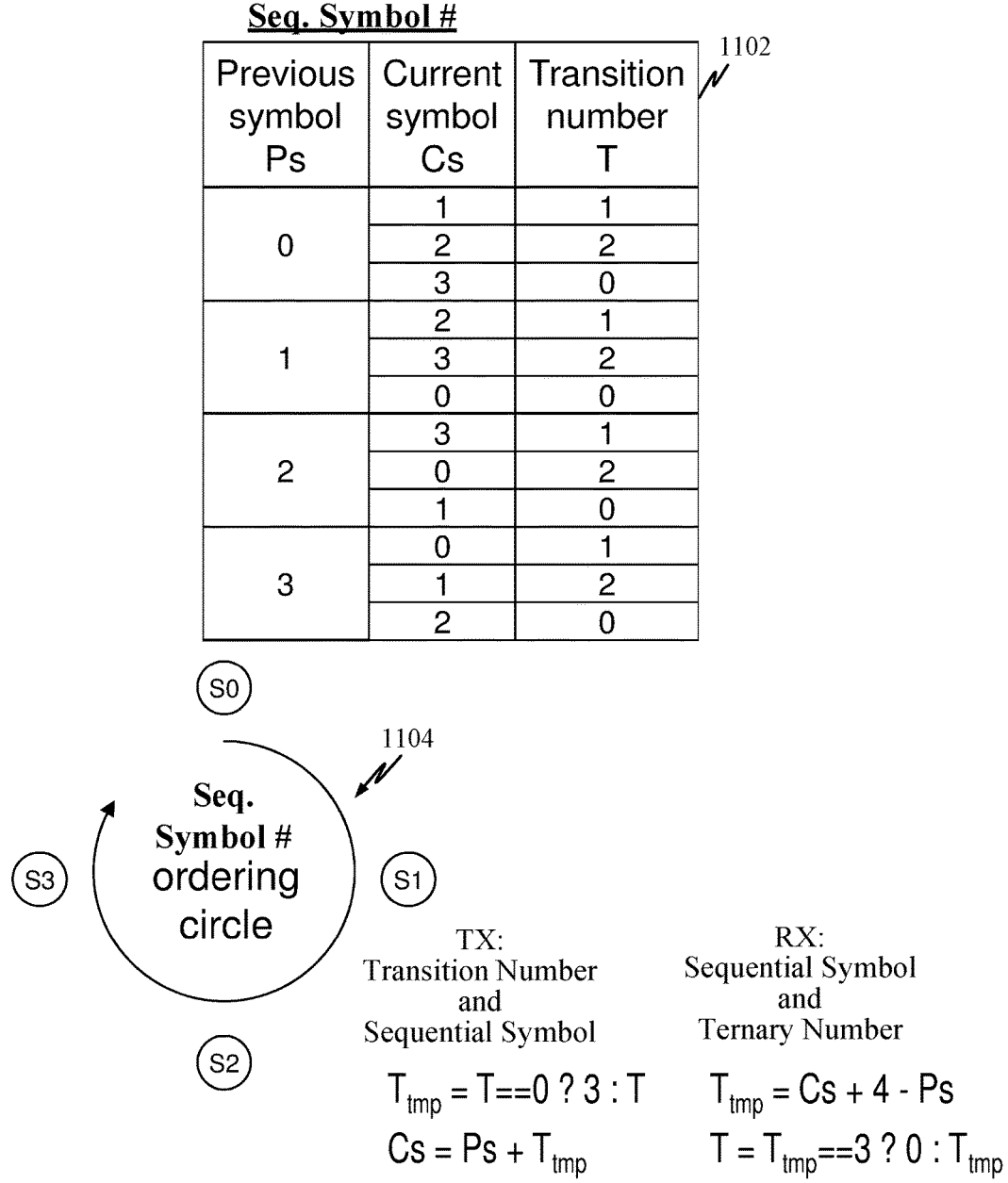
FIG. 11 illustrates the conversion between sequential symbols and transition numbers.

FIG. 11 illustrates the conversion between sequential symbols and transition numbers. This conversion maps each transition from a previous sequential symbol number (Ps) to a current sequential symbol (Cs) to a transition number (T). At the transmitter device, the transition numbers are being converted to sequential symbols. Because of the relative conversion scheme being used, the transition numbers guarantee that no two consecutive sequential symbols 1104 will be the same.

In one example for a 2-wire system, there are 4 raw symbols assigned to 4 sequential symbol S0, S1, S2, and S3. For the 4 sequential symbols, Table 1102 illustrates how a current sequential symbol (Cs) may be assigned based on a previous sequential symbol (Ps) and a temporary transition number $T_{tmp}$ based upon the current transition number (T).

In this example, the transition number $C_s$ may be assigned according to:

$$Cs=PS+T_{tmp}$$

where $T_{tmp}=T==0?3:T$. Alternatively stated, if the current transition number T is equal to zero, the temporary transition number $T_{tmp}$ becomes 3, else $T_{tmp}$ becomes equal to T. And once $T_{tmp}$ is calculated, Cs is set to Ps plus $T_{tmp}$. Moreover, on the receiver end, the logic is reversed to recover T, $T_{tmp}=C_s+4-P_s$ and $T=T_{tmp}==3?0:T_{tmp}$.

FIG. 12 illustrates a general example of converting a ternary number (base-3 number) to a binary number, where each T in {T11, T10, ... T2, T1, T0} is a symbol transition number.

FIG. 13 illustrates an exemplary method for converting a binary number (bits) to a 12 digit ternary number (base-3 number). Each digit can be calculated by dividing the remainder (result of a modulo operation) from a higher digit calculation with 3 to the power of the digit number, discarding decimal points numbers.

FIG. 14 illustrates an example of one possible implementation of the division and the module operations of the FIG. 13, which may be synthesizable by any commercial synthesis tools.

Exemplary Legacy Device and Operation Thereof

Figure 15:
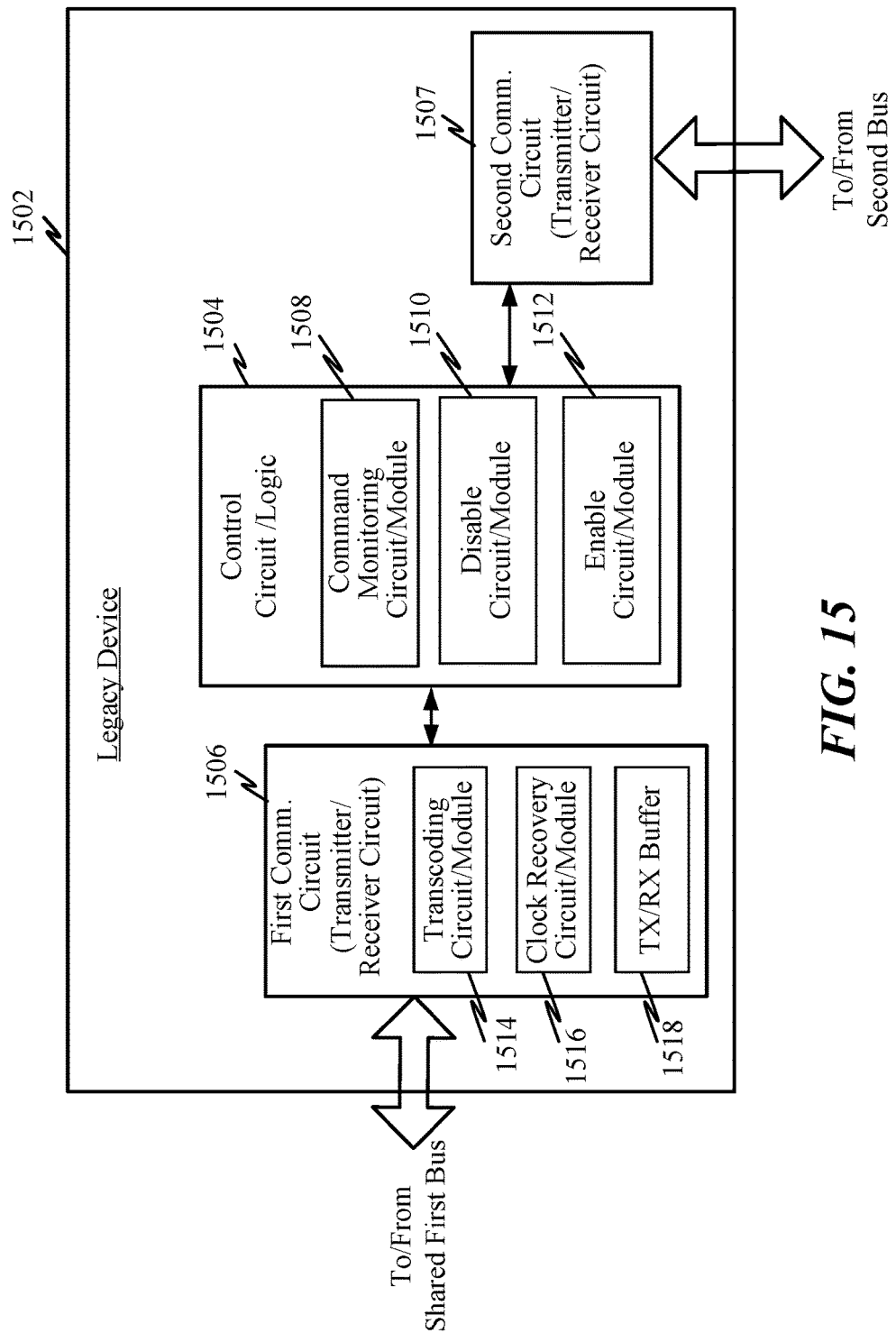
FIG. 15 is a block diagram illustrating an exemplary legacy device.

FIG. 15 is a block diagram illustrating an exemplary legacy device 1502. In one example, the legacy device 1502 may be a CCIe-compatible device. The legacy device 1502 may include a control circuit/logic 1504 coupled to a first communication circuit 1506 and a second communication circuit 1507. The first communication circuit 1506 may serve to couple to a shared first bus and may be configured to communicate over the first bus according to a first communication protocol. In one example, the first communication circuit 1506 may include or define a transmitter/receiver circuit 1506 that implement a transcoding circuit/module 1514, a clock recovery circuit/module 1516, and/or a transmit/receive buffer 1518. The transcoding circuit/module 1514 may perform one or more functions illustrated in FIGS. 8-14 to convert bits into symbols for transmission over the first bus and to convert received symbols to bits upon reception over the first bus. This transcoding may also effectively embed a clock within symbol-to-symbol transitions. The clock recovery circuit/module 1516 may serve to extract such embedded clock from the symbol-to-symbol transitions. The transmit/receive buffer 1518 may serve to buffer bits for transmission and/or during reception.

The second communication circuit 1507 may serve to couple to a second bus and may be configured to communicate over the second bus according to a third communication protocol.

The control circuit/logic 1504 may include or implement a command monitoring circuit/module 1508, a disable detection circuit/module 1510, and/or an enable detection circuit/module 1512. The control circuit/logic 1504 may be adapted to configure the communication circuit 1506 to communicate over the first bus using the first communication protocol. The command monitoring circuit/module 1508 may monitor the first bus for a disable command. If the disable command is detected over the first bus, then the disable circuit/module 1510 may fully or partially disable operation of the first communication circuit 1506 to ignore activity over the first bus.

In one example, the bus may be a two-line bus. In the first communication protocol signals may be transmitted over the two lines and a clock signal is embedded in symbol-to-symbol transitions of the plurality of symbols within the signals.

The disable command may cause the legacy device 1502 to stop operating over the first bus (e.g., stop transmitting and stop receiving over the first bus). For instance, the disable command may prevent the legacy device 1502 from communicating over the first bus until a power on reset or hardware reset of the legacy device or reception of an enable command from the second bus.

Figure 16:
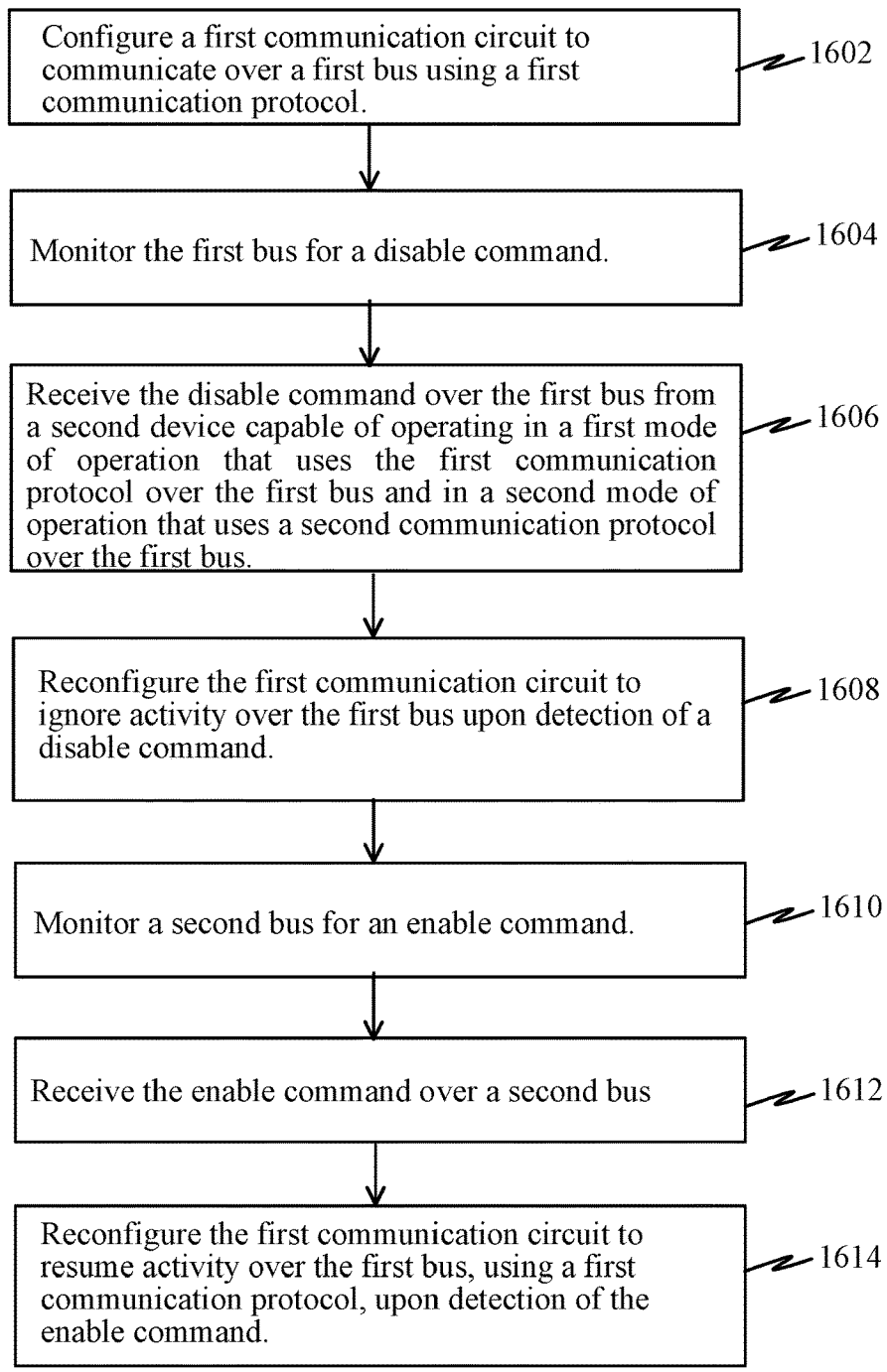
FIG. 16 illustrates an exemplary method that may be implemented by a legacy device.

FIG. 16 illustrates an exemplary method that may be implemented by a legacy device. A first communication circuit may be configured to communicate over a first bus using a first communication protocol 1602. The legacy device may monitor the first bus for a disable command 1604. The legacy device may receive the disable command over the first bus from a second device capable of operating in a first mode of operation that uses the first communication protocol and in a second mode of operation that uses a second communication protocol 1606. The first communication circuit may be reconfigured to ignore activity over the first bus upon detection of the disable command 1608.

The first communication protocol may provide a first data throughput over the first bus while the second communication protocol provides a second data throughput over the first bus, where the second data throughput is greater than the first data throughput.

The first bus may include two lines, and in the first mode of operation signals are transmitted over the two lines and a clock signal is embedded in symbol-to-symbol transitions of the plurality of symbols within the signals.

The disable command may be received prior to or concurrent with the first bus being switched to operate according to a second communication protocol unsupported by the legacy device.

Even though the legacy device may be disabled from using the first bus, it may continue to operate and/or monitor a second bus (or a channel) for an enable command 1610. The legacy device may receive such enable command over the second bus 1612 which causes it to reconfigure the first communication circuit to resume activity over the first bus, using the first protocol 1614.

In a first example, the first bus includes a plurality of lines, with N lines allocated for transmissions in the first mode, and M lines being allocated for transmissions in the second mode, where N and M are integers greater than or equal to two (2).

In one implementation, N and M may be different integers. In another implementation, N and M may be the same integer and different number of logical transmission lanes are defined in the first and second modes.

In a second example, in the first mode N=2 to support CCIe-compatible transmissions and in the second mode M=3 to support three factorial (3!) multi-wire multi-level differential transmissions.

In a third example, in the first mode N=4 to support 4-wire single ended multi-wire transmissions and in the second mode M=2×2 to support transmissions over a first differential pair using two lines and a second differential pair using another two lines.

In a fourth example, in the first mode N=2×2 to support two differential wire pairs of CCIe-compatible transmissions and in the second mode M=4 to support four factorial (4!) multi-wire multi-level differential transmissions.

In a fifth example, N=M=3, in the first mode 3-wire single-ended transmissions are used, and in the second mode one pair of lines is used for differential transmissions and the remaining single line is used for sideband signaling.

Exemplary Next-Generation Device and Operation Thereof

Figure 17:
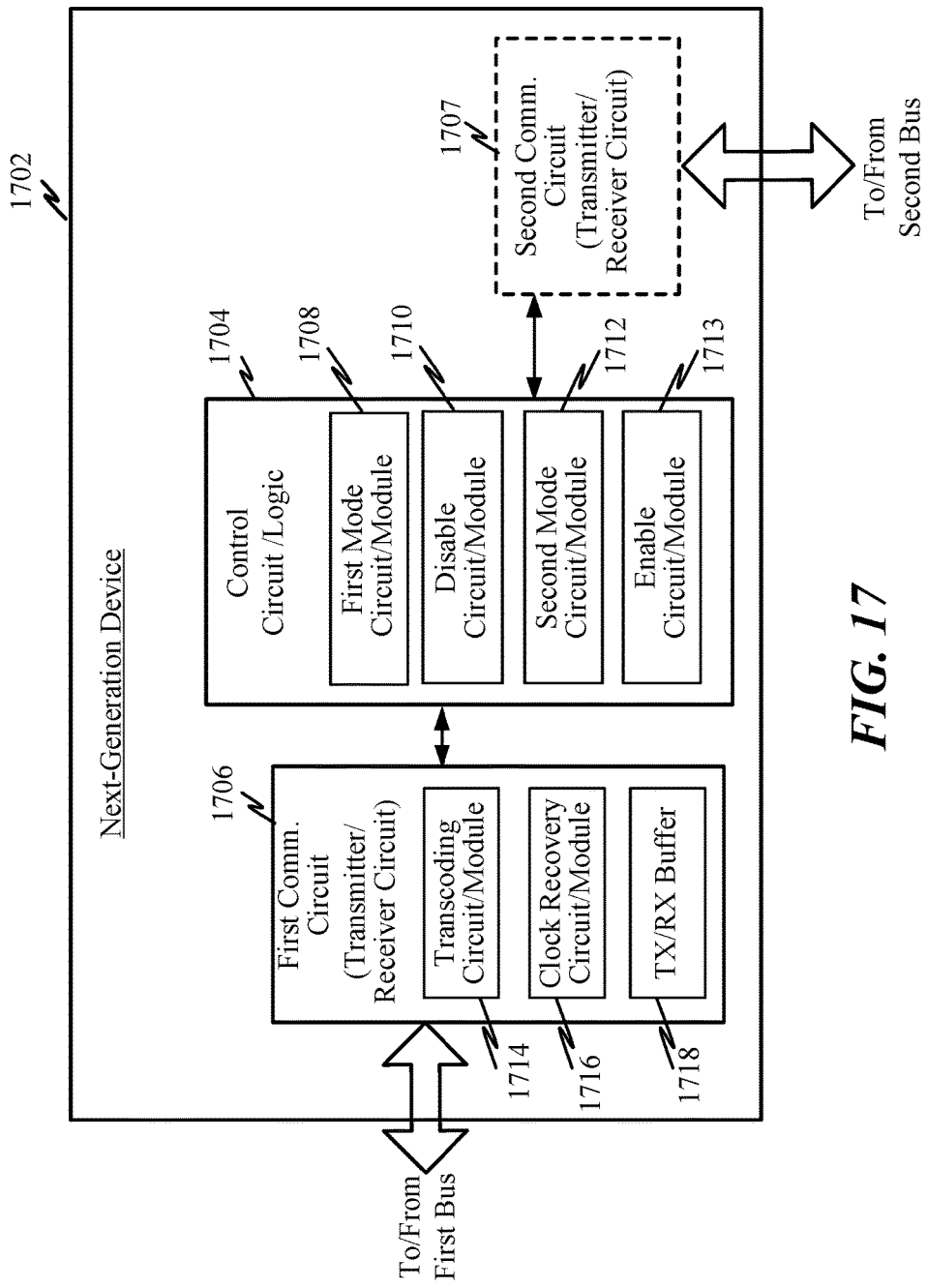
FIG. 17 is a block diagram illustrating an exemplary next-generation device.

FIG. 17 is a block diagram illustrating an exemplary next-generation device 1702. In various examples, the next-generation device 1702 may operate as a slave device or a master device. In one example, the next-generation device 1702 may be a CCIe-compatible device. The next-generation device 1702 may include a control circuit/logic 1704 coupled to a first communication circuit 1706 and, optionally, a second communication circuit 1707. For instance, when the next-generation device 1702 operates as a master device, it may include or activate the second communication circuit 1707 in order to re-enable legacy devices (i.e., over a second bus) that have been previously disabled.

The first communication circuit 1706 may serve to couple to a first bus shared with other devices. The first communication circuit 1706 may be configurable to communicate over the first bus according to a first communication protocol or a second communication protocol. In one example, in order for the next generation device to operate according to a first mode in which the first communication protocol is used, the first communication circuit 1706 may include or define a transmitter/receiver circuit 1706 that implements a transcoding circuit/module 1714, a clock recovery circuit/module 1716, and/or a transmit/receive buffer 1718. The transcoding circuit/module 1714 may perform one or more functions illustrated in FIGS. 8-14 to convert bits into symbols for transmission over the first bus and to convert received symbols to bits upon reception over the first bus when using the first communication protocol. This transcoding may also effectively embed a clock within symbol-to-symbol transitions. The clock recovery circuit/module 1716 may serve to extract such embedded clock from the symbol-to-symbol transitions. The transmit/receive buffer 1718 may serve to buffer bits for transmission and/or during reception.

The control circuit 1704 may include or implement a first mode circuit/module 1708 adapted to configure the first communication circuit 1706 to operate in the first mode in which the first communication protocol is used over the first bus.

In order to operate in the second mode in which a second protocol is used, when the next generation device operates as a master device the control circuit 1704 may include or implement a disable circuit/module 1710 that sends a disable command over the first bus to indicate to other devices that do not support a second communication protocol to ignore activity over the first bus. The control circuit 1704 may include or implement a second mode circuit/module adapted to reconfigure the first communication circuit to operate in a second mode in which the second communication protocol is used over the first bus. In the second mode of operation the first communication circuit 1706 may disable operation of, for example, the transcoding circuit/module 1714 and/or clock recovery circuit/module 1716.

When the next-generation device 1702 operates as a master device, the control circuit 1704 may include or implement an enable circuit/module that sends an enable command over the second communication circuit (e.g., through the second bus) to indicate to the other devices (e.g., legacy devices) to resume activity over the first bus. The first communication circuit 1706 may be reconfigured to operate in the first mode in which the first communication protocol is used over the first bus.

In one example, the first communication protocol provides a first data throughput/rate over the bus while the second communication protocol provides a second data throughput/rate over the first bus, where the second data throughput/rate is greater than the first data throughput/rate.

The first bus may include or be defined by two lines, wherein the first mode of operation signals are transmitted over the two lines and a clock signal is embedded in symbol-to-symbol transitions of the plurality of symbols within the signals.

The disable command may prevent the other devices from communicating over the first bus until a power on reset or hardware reset of each of the other devices or an enable command is otherwise effectuated on the other devices. The disable command may be sent prior to or concurrent with the device entering the second mode.

The first communication circuit 1706 may include a receiver device capable of at least partially decoding signals on the first bus using just a clock signal embedded within signals transmitted according to the first communication protocol.

In a first example, the first bus includes a plurality of lines, with N lines allocated for transmissions in the first mode, and M lines being allocated for transmissions in the second mode, where N and M are integers greater than or equal to two (2).

In one implementation, N and M may be different integers. In another implementation, N and M may be the same integer and different number of logical transmission lanes are defined in the first and second modes.

In a second example, in the first mode N=2 to support CCIe-compatible transmissions and in the second mode M=3 to support three factorial (3!) multi-wire multi-level differential transmissions.

In a third example, in the first mode N=4 to support 4-wire single ended multi-wire transmissions and in the second mode M=2×2 to support transmissions over a first differential pair using two lines and a second differential pair using another two lines.

In a fourth example, in the first mode N=2×2 to support two differential wire pairs of CCIe-compatible transmissions and in the second mode M=4 to support four factorial (4!) multi-wire multi-level differential transmissions.

In a fifth example, N=M=3, in the first mode 3-wire single-ended transmissions are used, and in the second mode one pair of lines is used for differential transmissions and the remaining single line is used for sideband signaling.

Figure 18:
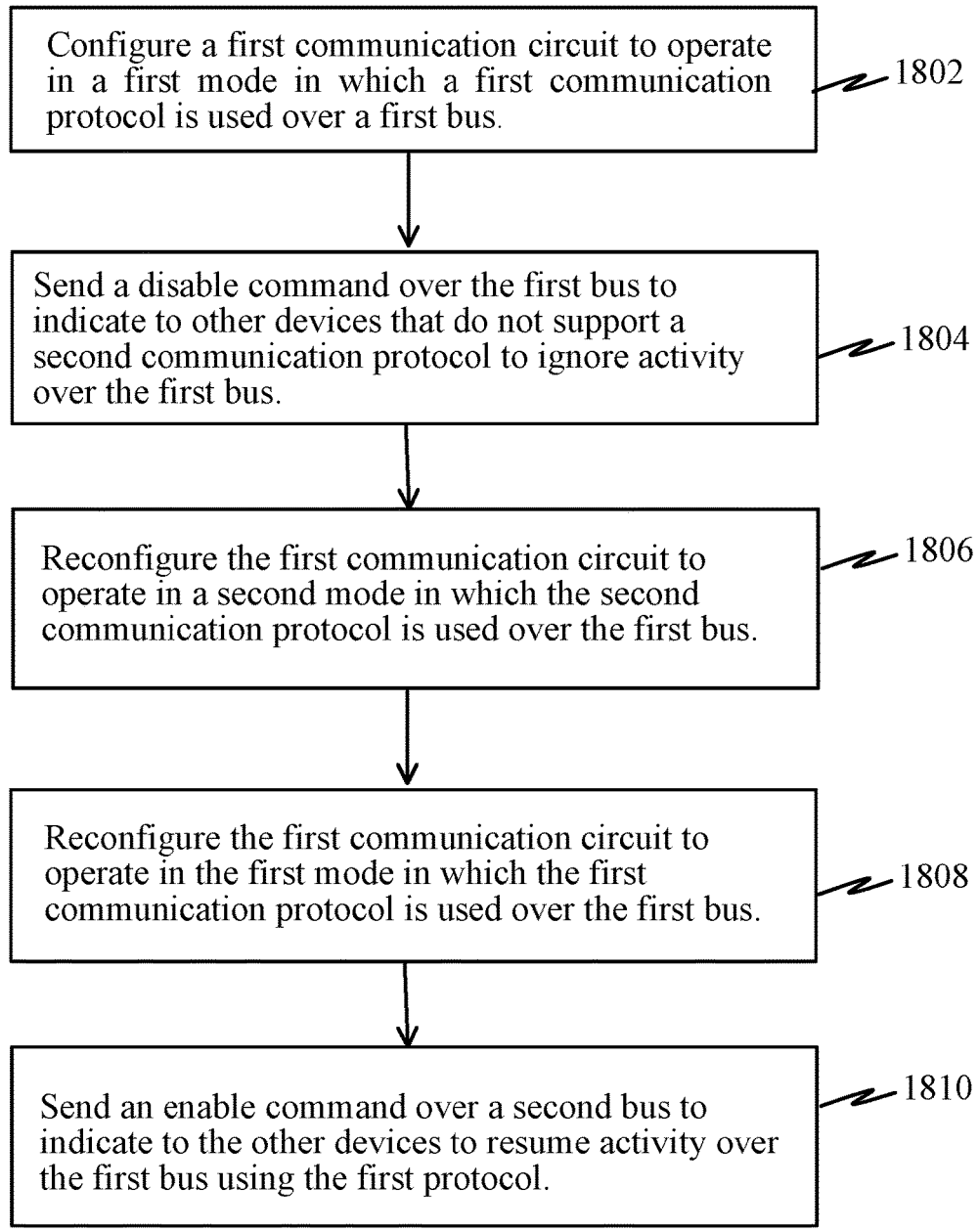
FIG. 18 illustrates an exemplary method that may be implemented by a next-generation device when operating as a master device over a shared bus.

FIG. 18 illustrates an exemplary method that may be implemented by a next-generation device when operating as a master device. A first communication circuit may be configured to operate in a first mode in which a first communication protocol is used over a first bus 1802. The next-generation device may send a disable command over the first bus to indicate to other devices that do not support a second communication protocol to ignore activity over the first bus 1804. Subsequently, the first communication circuit may be reconfigured to operate in a second mode in which the second communication protocol is used over the first bus 1806.

Subsequently, the next-generation device may reconfigure the first communication circuit to operate in the first mode in which the first communication protocol is used over the first bus 1808. The next-generation device then sends an enable command over a second bus to indicate to the other devices to resume activity over the first bus using the first protocol 1810.

The bus may include two lines, and in the first mode of operation signals are transmitted over the two lines and a clock signal is embedded in symbol-to-symbol transitions of the plurality of symbols within the signals.

In one example, the sleep or disable command may be sent prior to or concurrent with the device entering the second mode.

Figure 19:
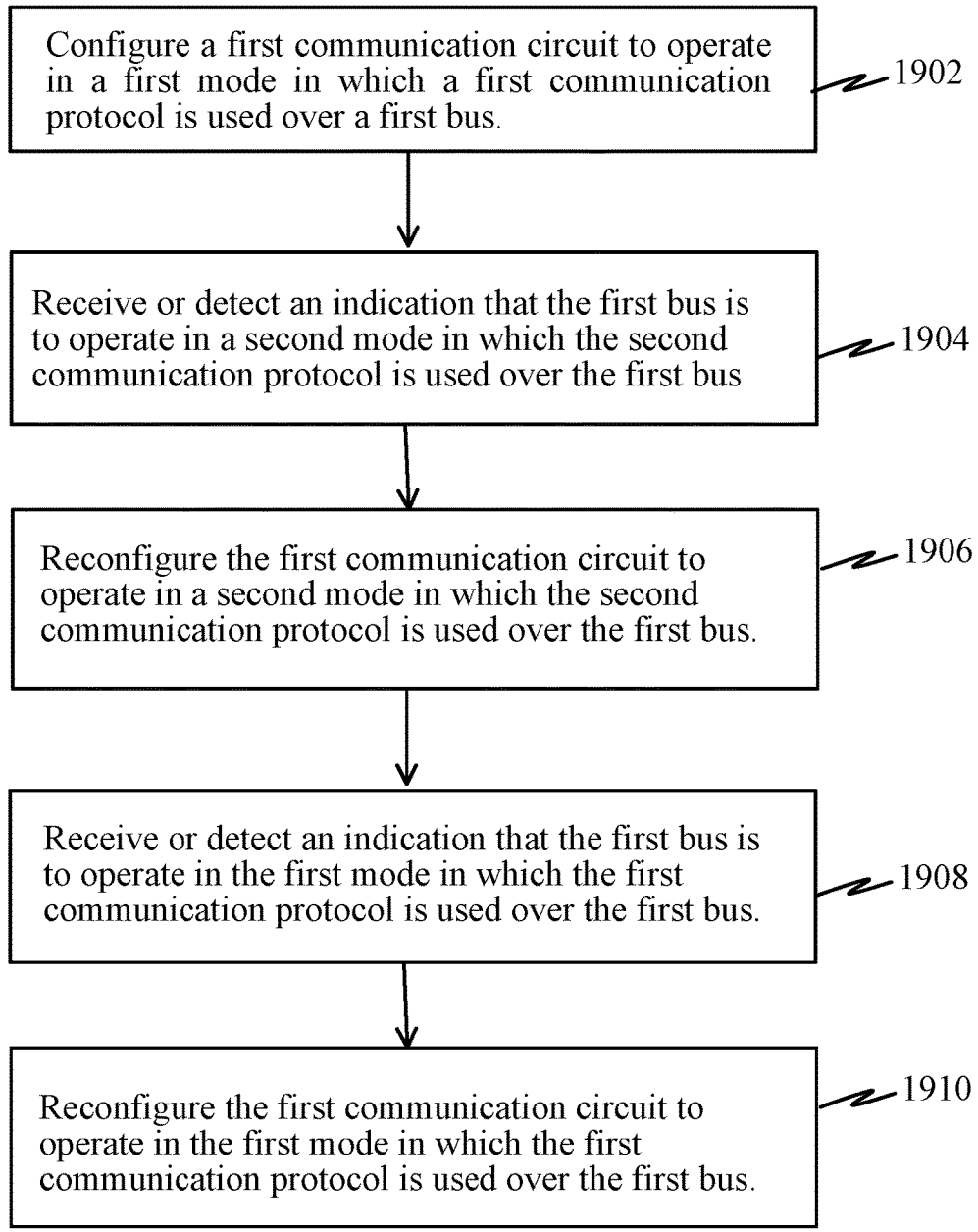
FIG. 19 illustrates an exemplary method that may be implemented by a next-generation device when operating as a slave device over a shared bus.

FIG. 19 illustrates an exemplary method that may be implemented by a next-generation device when operating as a slave device over a shared bus. In some examples, this next-generation device may be coupled solely to a shared first bus. A first communication circuit may be configured to operate in a first mode in which a first communication protocol is used over the first bus 1902.

The next-generation device may subsequently receive or detect an indication that the first bus is to operate in a second mode in which the second communication protocol is used over the first bus 1904. Consequently, the first communication circuit may be reconfigured to operate in a second mode in which the second communication protocol is used over the first bus 1906.

The next-generation device may subsequently receive or detect an indication that the first bus is to operate in a second mode in which the second communication protocol is used over the first bus 1908.

Consequently, the next-generation device may reconfigure the first communication circuit to operate in the first mode in which the first communication protocol is used over the first bus 1910 and/or optionally over the second bus.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A device, comprising:
a first bus;
a second bus separate from the first bus;
a first set of devices coupled to the first bus and the second bus, the first set of devices configured to communicate over the first bus according to a first communication protocol, wherein the first set of devices is coupled to the first bus via at least one first connection and coupled to the second bus via at least one second connection, and wherein the at least one first connection is physically distinct from the at least one second connection; and
a second set of devices coupled to the first bus, the second set of devices configured to communicate over the first bus according to both the first communication protocol and a second communication protocol,
wherein
in a first mode of operation over the first bus, the first set of devices and second set of devices concurrently communicate over the first bus using the first communication protocol;
in a second mode of operation over the first bus, the second set of devices communicate with each other using the second communication protocol over the first bus, and the first set of devices are caused to stop operating over the first bus;
a disable command is sent over the first bus to cause the first set of devices to stop operating over the first bus while the second set of devices operate in the second mode over the first bus;
an enable command is sent over the second bus to cause the first set of devices to resume operating over the first bus while the first bus switches to operate in the first mode;
the first bus includes a plurality of lines, with N lines allocated for transmissions in the first mode, and M lines allocated for transmissions in the second mode; and
N and M are same integers greater than or equal to two (2) and a different number of logical transmission lanes are defined in the first and second modes.

2. The device of claim 1, wherein the first communication protocol provides a first data throughput over the first bus while the second communication protocol provides a second data throughput over the first bus, where the second data throughput is greater than the first data throughput.

3. The device of claim 1, wherein the disable command prevents each of the first set of devices from receiving and transmitting over the first bus.

4. The device of claim 1, wherein prior to or concurrent with entering the second mode of operation, at least one device from the second set of devices sends the disable command.

5. The device of claim 1, wherein during the second mode of operation the first set of devices are unaffected by activity over the first bus.

6. A method, comprising:
coupling a first set of devices to a first bus and a second bus separate from the first bus, the first set of devices configured to communicate over the first bus according to a first communication protocol, wherein the first set of devices is coupled to the first bus via at least one first connection and coupled to the second bus via at least one second connection, and wherein the at least one first connection is physically distinct from the at least one second connection;
coupling a second set of devices to the first bus, the second set of devices configured to communicate over the first bus according to both the first communication protocol and a second communication protocol;
configuring, in a first mode of operation, the first set of devices and the second set of devices to concurrently communicate over the first bus using the first communication protocol;
sending a disable command, from at least one device of the second set of devices, over the first bus during the first mode of operation to cause the first set of devices to stop operating over the first bus;
configuring, in a second mode of operation, the second set of devices to communicate with each other using the second communication protocol over the first bus; and
sending an enable command, from at least one device of the second set of devices, over the second bus to cause the first set of devices to resume operating over the first bus while the first bus switches to operate in the first mode,
wherein the first bus includes a plurality of lines, with N lines allocated for transmissions in the first mode, and M lines allocated for transmissions in the second mode, and wherein N and M are same integers greater than or equal to two (2) and a different number of logical transmission lanes are defined in the first and second modes.

7. The method of claim 6, wherein during the second mode of operation the first set of devices are unaffected by activity over the first bus.

8. The method of claim 7, wherein each of the first set of devices includes a receiver device that enters into a disabled mode upon receipt of the disable command.

9. The method of claim 7, wherein each of the first set of devices includes a receiver device that enters into an enabled mode upon receipt of the enable command.

10. A device, comprising:
a first communication circuit to couple to a first bus and configured to communicate over the first bus according to a first communication protocol;
a second communication circuit to couple to a second bus separate from the first bus, wherein the first communication circuit is coupled to the first bus via a first connection and the second communication circuit is coupled to the second bus via a second connection, and wherein the first connection is physically distinct from the second connection; and
a control circuit coupled to the first communication circuit and the second communication circuit, the control circuit adapted to:
configure the first communication circuit to communicate over the first bus using the first communication protocol,
monitor the first bus for a disable command,
reconfigure the first communication circuit to ignore activity over the first bus upon detection of the disable command,
monitor the second bus for an enable command, and
reconfigure the first communication circuit to resume activity over the first bus upon detection of the enable command,
wherein the first bus includes a plurality of lines, with N lines allocated for transmissions in a first mode, and M lines allocated for transmissions in a second mode, and wherein N and M are same integers greater than or equal to two (2) and a different number of logical transmission lanes are defined in the first and second modes.

11. The device of claim 10, wherein in the first mode N=4 to support 4-wire single ended multi-wire transmissions and in the second mode M=2×2 to support transmissions over a first differential pair using two lines and a second differential pair using another two lines.

12. The device of claim 10, wherein in the first mode N=2×2 to support two differential wire pairs of CCIe-compatible transmissions and in the second mode M=4 to support four factorial (4!) multi-wire multi-level differential transmissions.

13. The device of claim 10, wherein N=M=3, in the first mode 3-wire single-ended transmissions are used, and in the second mode one pair of lines is used for differential transmissions and a remaining single line is used for sideband signaling.

14. A device, comprising:
a first communication circuit to couple to a first bus shared with other devices;
a second communication circuit to couple to a second bus shared with the other devices, wherein the second bus is separate from the first bus, wherein the first communication circuit is coupled to the first bus via a first connection and the second communication circuit is coupled to the second bus via a second connection, and wherein the first connection is physically distinct from the second connection; and
a control circuit coupled to the first communication circuit and the second communication circuit, the control circuit configured to:
configure the first communication circuit to operate in a first mode in which a first communication protocol is used over the first bus;
send a disable command over the first bus to indicate to other devices that do not support a second communication protocol to ignore activity over the first bus;
reconfigure the first communication circuit to operate in a second mode in which the second communication protocol is used over the first bus;
reconfigure the first communication circuit to operate in the first mode in which the first communication protocol is used over the first bus; and
send an enable command over the second bus to indicate to the other devices to resume activity over the first bus using the first communication protocol,
wherein the first bus includes a plurality of lines, with N lines allocated for transmissions in the first mode, and M lines allocated for transmissions in the second mode, and wherein N and M are same integers greater than or equal to two (2) and a different number of logical transmission lanes are defined in the first and second modes.

15. The device of claim 14, wherein the disable command prevents the other devices that do not support the second communication protocol from communicating over the first bus.

16. The device of claim 14, wherein the disable command is sent prior to or concurrent with the first communication circuit entering the second mode.

17. The device of claim 14, wherein in the first mode N=4 to support 4-wire single ended multi-wire transmissions and in the second mode M=2×2 to support transmissions over a first differential pair using two lines and a second differential pair using another two lines.

18. The device of claim 14, wherein in the first mode N=2×2 to support two differential wire pairs of CCIe-compatible transmissions and in the second mode M=4 to support four factorial (4!) multi-wire multi-level differential transmissions.

19. The device of claim 14, wherein N=M=3, in the first mode 3-wire single-ended transmissions are used, and in the second mode one pair of lines is used for differential transmissions and a remaining single line is used for sideband signaling.

* * * * *